US012174016B2

(12) United States Patent
Jang et al.

(10) Patent No.: US 12,174,016 B2
(45) Date of Patent: Dec. 24, 2024

(54) CHIP-SCALE FREQUENCY-COMB ASSISTED COHERENT LIDAR RANGING WITH SUB-MICROMETER PRECISION

(71) Applicant: The Regents of the University of California, Oakland, CA (US)

(72) Inventors: Yoon-Soo Jang, Los Angeles, CA (US); Chee Wei Wong, Los Angeles, CA (US); Hao Liu, Los Angeles, CA (US); Jinghui Yang, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 919 days.

(21) Appl. No.: 17/287,061

(22) PCT Filed: Nov. 6, 2019

(86) PCT No.: PCT/US2019/060128
§ 371 (c)(1),
(2) Date: Apr. 20, 2021

(87) PCT Pub. No.: WO2020/097241
PCT Pub. Date: May 14, 2020

(65) Prior Publication Data
US 2021/0381819 A1    Dec. 9, 2021

Related U.S. Application Data

(60) Provisional application No. 62/756,506, filed on Nov. 6, 2018.

(51) Int. Cl.
*G01S 7/48* (2006.01)
*G01B 9/02001* (2022.01)
(Continued)

(52) U.S. Cl.
CPC .......... *G01B 9/02008* (2013.01); *G01S 7/484* (2013.01); *G01S 17/36* (2013.01);
(Continued)

(58) Field of Classification Search
None
See application file for complete search history.

(56) References Cited

U.S. PATENT DOCUMENTS 5,581,642 A    12/1996  Deacon et al.
7,054,009 B2    5/2006  Depue et al.
(Continued)

FOREIGN PATENT DOCUMENTS

CN    105428990 A    3/2016
CN    110168444 A    8/2019
(Continued)

OTHER PUBLICATIONS

Joshi et al., "Thermally controlled comb generation and soliton modelocking in microresonators", Optics Letters, Jun. 1, 2016, vol. 41, No. 11, pp. 2565-2568.
(Continued)

*Primary Examiner* — Hovhannes Baghdasaryan
(74) *Attorney, Agent, or Firm* — KPPB LLP

(57) ABSTRACT

Systems and methods for soliton microcomb-based precision dimensional metrology via spectrally-resolved interferometry are described. In an embodiment, the system includes a dual-pumped soliton microcomb generator comprising a pump, a microresonator, and an auxiliary pump and that generates a single-soliton microcomb, an erbium-doped fiber amplifier that amplifies a C-band section of the soliton microcomb and a non-polarizing beam splitter that divides the soliton microcomb pulses into a reference arm pulse and a measurement arm pulse for an interferometer and recom-
(Continued)

bines the reference arm pulse and the measurement arm pulse into a recombined beam upon their return.

15 Claims, 19 Drawing Sheets

(51) Int. Cl.
    *G01S 7/484*     (2006.01)
    *G01S 17/36*     (2006.01)
    *G02F 1/365*     (2006.01)
    *H01S 3/067*     (2006.01)

(52) U.S. Cl.
    CPC .......... *G02F 1/365* (2013.01); *H01S 3/06708* (2013.01); *H01S 3/06754* (2013.01)

(56) References Cited

U.S. PATENT DOCUMENTS

| | | |
|---|---|---|
| 7,496,117 B2 | 2/2009 | Tang et al. |
| 7,502,532 B2 | 3/2009 | McCallion et al. |
| 7,684,664 B2 | 3/2010 | Digonnet et al. |
| 7,965,914 B2 | 6/2011 | Xu et al. |
| 9,537,571 B2 | 1/2017 | Li et al. |
| 9,612,458 B1 | 4/2017 | Lentine et al. |
| 9,880,446 B2 | 1/2018 | Gottschall et al. |
| 9,905,999 B2 | 2/2018 | Li et al. |
| 10,454,238 B2 | 10/2019 | Fermann et al. |
| 11,063,402 B2 | 7/2021 | Wong et al. |
| 11,105,979 B2 | 8/2021 | Yao et al. |
| 11,175,563 B2 | 11/2021 | Wong et al. |
| 2007/0071386 A1 | 3/2007 | Digonnet et al. |
| 2010/0317790 A1 | 12/2010 | Jang et al. |
| 2011/0019957 A1 | 1/2011 | Alameh |
| 2011/0255554 A1 | 10/2011 | Delfyett |
| 2012/0039344 A1 | 2/2012 | Kian et al. |
| 2013/0003766 A1 | 1/2013 | Savchenkov et al. |
| 2014/0064734 A1 | 3/2014 | Witzens |
| 2014/0110572 A1 | 4/2014 | Li et al. |
| 2015/0030040 A1 | 1/2015 | Zhou et al. |
| 2015/0338202 A1 | 11/2015 | Xiang et al. |
| 2016/0011489 A1 | 1/2016 | Herr et al. |
| 2016/0139487 A1 | 5/2016 | Popovic et al. |
| 2016/0147014 A1 | 5/2016 | Ptasinski et al. |
| 2016/0161675 A1 | 6/2016 | Englund et al. |
| 2016/0327743 A1 | 11/2016 | Kippenberg et al. |
| 2017/0329086 A1 | 11/2017 | Latawiec et al. |
| 2018/0006424 A1 | 1/2018 | Vahala et al. |
| 2018/0083599 A1 | 3/2018 | Kippenberg et al. |
| 2018/0261288 A1 | 9/2018 | Frumkin |
| 2019/0296512 A1 | 9/2019 | Wong et al. |
| 2021/0063646 A1 | 3/2021 | Yao et al. |
| 2021/0286230 A1 | 9/2021 | Wong et al. |

FOREIGN PATENT DOCUMENTS

| | | |
|---|---|---|
| EP | 3500892 A1 | 6/2019 |
| EP | 3532895 A1 | 9/2019 |
| EP | 3676646 A1 | 7/2020 |
| WO | 2018081824 A1 | 5/2018 |
| WO | 2018089075 A1 | 5/2018 |
| WO | 2019046645 A1 | 3/2019 |
| WO | 2019180655 A1 | 9/2019 |
| WO | 2020097241 A1 | 5/2020 |

OTHER PUBLICATIONS

Jung et al., "In-Resonator Variation of Waveguide Cross-Sections for Dispersion Control of Aluminum Nitride Micro-Rings", Optics Express, Nov. 30, 2015, vol. 23, No. 24, pp. 30634-30640, DOI:10.1364/OE.23.030634.

Kang Etal, "Real-time compensation of the refractive index of air in distance measurement", Optics Express, Oct. 2015, vol. 23, No. 20, pp. 26377-26385, DOI: 10.1364/OE.23.026377.

Karpov et al., "Universal dynamics and deterministic switching of dissipative Kerr solitons in optical microresonators", Nature Physics, Sep. 2016, pp. 1-6, doi 10.1038/nphyS3893.

Kim, "Metrology: combs rule", Nat. Photon, 2009, vol. 3, No. 6, pp. 313-314.

Kim et al., "High-Performance Flexible Graphene Field Effect Transistors with ion Gel Gate Dielectrics", Nano Lett., 2010, vol. 10, 3464-3466. Abstract, p. 3464 col. 2, p. 3465 col. 2, p. 3466 col. 1.

Kim et al., "Large-scale pattern growth of graphene films for stretchable transparent electrodes", Nature, Jan. 14, 2009, vol. 457, pp. 706-710, https://doi.org/10.1038/nature07719.

Kippenberg et al., "Dissipative Kerr solitons in optical microresonators", Science, Aug. 10, 2018, vol. 361, 567, 13 pgs., DOI:10.1126/science.aan.8083.

Kippenberg et al., "Microresonator-Based Optical Frequency Combs", Science, Apr. 29, 2011, vol. 332, pp. 555-559.

Koppens et al., "Photodetectors based on graphene, other two-dimensional materials and hybrid systems", Nature Nanotechnology, Oct. 2014, vol. 9, No. 10, pp. 780-793, doi: 10.1038/nnano.2014.215.

Kordts et al., "Higher Order Mode Suppression in High-Q Anomalous Dispersion SiN Microresonators for Temporal Dissipative Kerr Soliton Formation", Optics Letters, Jan. 19, 2016, vol. 41, No. 3, 5 pgs.

Kordts et al., "Higher order mode suppression in high-Q anomalous dispersion SiN microresonators for temporal dissipative Kerr soliton formation.", Nov. 17, 2015, pp. 1-5, arXiv:1511.05381.

Krausz et al., "Attosecond metrology: from electron capture to future signal processing", Nature Photonics, vol. 8, Mar. 2014, Published Online: Feb. 28, 2014, pp. 205-213, DOI: 10.1038/NPHOTON.2014.28.

Lamont et al., "Route to stabilized ultrabroadband microresonator-based frequency combs", Optics Letters, 2013, vol. 38, Issue 18, pp. 3478-34811.

Larkin et al., "Efficient nonlinear algorithm for envelope detection in white light interferometry", Journal Opt. Soc. Am. A., Apr. 1996, vol. 13, No. 4, pp. 832-843.

Lee, "Colloidal superlattices for unnaturally high-index metamaterials at broadband optical frequencies", Optics Express, Nov. 2, 2015, vol. 23, No. 22, pp. 28170-28181, first published Oct. 19, 2015, doi:10.1364/OE.23.028170.

Lee et al., "Time-of-flight measurement with femtosecond light pulses", Nature Photonics, Oct. 2010, vol. 4, pp. 716-720, first published Aug. 8, 2010, DOI: 10.1038/nphoton.2010.175.

Lepetit et al., "Linear techniques of phase-measurement by femtosecond spectral interferometry for applications in spectroscopy", J. Opt. Soc. Am. B, Dec. 1995, vol. 12, No. 12, pp. 2467-2474.

Li et al., "Compact and stable temporally magnified tomography using phase-locked broadband source", Optics Letters, 2016, vol. 41, Issue 7, pp. 1562-1565, http://dx.doi.org/10.1364/OL.41.001562.

Li et al., "A laser frequency comb that enables radial velocity measurements with a precision of 1 cm s-1", Nature, vol. 452, Apr. 3, 2008, pp. 610-612, doi:10.1038/nature06854.

Li et al., "Dirac charge dynamics in graphene by infrared spectroscopy", Nature Physics, Jul. 2008, vol. 4, pp. 532-535, published online Jun. 8, 2008, doi:10.1038/nphys989.

Li et al., "Optimization of Adiabatic Microring Resonators with Few-Mode and High-Q Resonances", Applied Optics, Dec. 1, 2015, vol. 54, No. 34, 6 pgs.

Liang et al., "High spectral purity Kerr frequency comb radio frequency photonic oscillator", Nature Communications, Aug. 11, 2015, vol. 6, No. 7957, pp. 1-8.

Liu et al., "A graphene-based broadband optical modulator", Nature, May 11, 2011, vol. 474, pp. 64-67, doi:10.1038/nature10067.

Liu et al., "Investigation of mode coupling in normal-dispersion silicon nitride microresonators for Kerr frequency comb generation", Optica, vol. 1, No. 3, Sep. 2014, pp. 137-144, http://dx.doi.org/10.1364/OPTICA.1.000137.

(56) References Cited

OTHER PUBLICATIONS

Liu et al., "Plasmon resonance enhanced multicolour photodetection by graphene", Nature Communications, Dec. 6, 2011, vol. 2, No. 579, pp. 1-7, doi:10.1038/ncomms1589.
Liu et al., "Sub-micron absolute distance measurements in sub-millisecond times with dual free-running femtosecond Er fiber-lasers", Optics Express, Sep. 12, 2011, vol. 19, No. 19, pp. 18501-18509, first published Sep. 7, 2011.
Manzoni et al., "Coherent pulse synthesis: towards sub-cycle optical waveforms", Laser & Photonics Reviews, 2015, vol. 9, No. 2, pp. 129-171.
Marin-Palomo et al., "Microresonator-based solitons for massively parallel coherent optical communications", Nature Jun. 8, 2017, vol. 546, pp. 274-279, DOI: 10.1038/nature22387.
Matsko et al., "On timing jitter of mode locked Kerr frequency combs", Optics Express, Nov. 18, 2013, vol. 21, No. 23, pp. 28862-28876.
Mikhailov et al., "A new electromagnetic mode in graphene", Phys. Rev. Lett., 2007, arXiv:cond/0703406, Mar. 15, 2007, 5 pgs.
Mikhailov et al., "New Electromagnetic Mode in Graphene", Physical Review Letters, Jul. 6, 2007, vol. 99, 016803, pp. 016803-1-016803-4, doi: 10.1103/PhysRevLett.99.016803.
Mikkelsen et al., "Adiabatically Widened Silicon Microrings for Improved Variation Tolerance", Optics Express, Apr. 21, 2014, vol. 22, No. 8, , pp. 9659-9966, DOI: DOI: 10.1364/OE.22.009659.
Minoshima et al., "High-accuracy measurement of 240-m distance in an optical tunnel by use of a compact femtosecond laser", Applied Optics, Oct. 20, 2000, vol. 39, No. 30, pp. 5512-5517.
Moss et al., "New CMOS-compatible platforms based on silicon nitride and Hydex for nonlinear optics", Nature Photonics, Aug. 2013, vol. 7, pp. 597-607, published online Jul. 30, 2013, DOI: 101038/nphoton2013/183.
Ooi et a., "Waveguide engineering of graphene's nonlinearity", Applied Physics Letters, Sep. 18, 2014, vol. 105, pp. 111110-1-111110-4, http://dx.doi.org/10.1063/1.4895934.
Papp et al., "Microresonator frequency comb optical clock", Optica, vol. 1, Jul. 22, 2014, pp. 10-14.
Papp et al., "Parametric seeding of a microresonator optical frequency comb", Optics Express, vol. 21, No. 15, Jul. 29, 2013, pp. 17615-17624, doi:10.1364/oe.21.017615.
Parra-Rivas et al., "Dynamics of localized and patterned structures in the Lugiato-Lefever equation determine the stability and shape of optical frequency combs", Physical Review A, Jan. 2014, vol. 89, pp. 043813-1-043813-12, doi: 10.11038PhysRevA.89.043813.
Parra-Rivas et al., "Third-order chromatic dispersion stabilizes Kerr frequency combs", Optics Letters, 2014, vol. 39, Issue 10, pp. 2971-2975, arXiv:1403.0903.
Pfeifle et al., "Coherent terabit communications with microresonator Kerr frequency combs", Europe PMC Funders Group, Author Manuscript, published in final edited for as: National Photonics, May 1, 2014, vol. 8, No. 5, pp. 375-380, doi:10.1038/nphoton.2014.57.
Phare et al., "Graphene electro-optic modulator with 30 GHz bandwidth", Nature Photonics, Aug. 2015, vol. 9, pp. 511-514, published online Jul. 13, 2015, doi: 10.1038/nphoton.2015.122.
Piglosiewics et al., "Carrier-envelope phase effects on the strong-field photoemission of electrons from metallic nanostructures", Nature Photonics, vol. 8, Jan. 2014, Published Online: Nov. 10, 2013, pp. 37-42, DOI:10.1038/NPHOTON.2013.288.
Roy et al., "Dynamics of periodic pulse collisions in a strongly dissipative-dispersive system", Physical Review Letters, May 27, 2005, vol. 94, No. 20, pp. 203903-1-203903-4, doi: 10.1103/PhysRevLett.94.203903.
Saglamyurek et al., "Broadband waveguide quantum memory for entangled photons", Nature, Jan. 12, 2011, vol. 469, pp. 512-515, DOI:10.1038/nature09719.
Extended European Search Report for European Application No. 17865633.6, Search completed Apr. 28, 2020, Mailed May 8, 2020 10 pgs.
Extended European Search Report for European Application No. 17869363.6 Search completed Feb. 28, 2020, Mailed Mar. 9, 2020, 9 Pgs.
Extended Search Report for European Application No. 18851696.7, Search completed Mar. 31, 2021, Mailed Apr. 19, 2021, 5 Pgs.
International Preliminary Report on Patentability for International Application PCT/US2018/048954, Report issued Mar. 3, 2020, Mailed on Mar. 12, 2020, 5 Pgs.
International Preliminary Report on Patentability for International Application PCT/US2019/060128, Report issued May 11, 2021, Mailed May 20, 2021, 6 Pgs.
International Preliminary Report on Patentability for International Application PCT/US2017/047413, Report issued Feb. 19, 2019, Mailed Feb. 28, 2019, 5 Pgs.
International Preliminary Report on Patentability for International Application PCT/US2017/059390, Report issued Apr. 30, 2019, Mailed May 9, 2019, 6 Pgs.
International Search Report and Written Opinion for International Application No. PCT/US2019/060128, Search completed Jan. 13, 2020, Mailed Jan. 28, 2020, 10 Pgs.
International Search Report and Written Opinion for International Application No. PCT/US2017/047413, Search completed Apr. 11, 2018, Mailed Apr. 26, 2018, 10 Pgs.
International Search Report and Written Opinion for International Application No. PCT/US2017/059390, Search completed Jan. 26, 2018, Mailed Feb. 9, 2018, 12 Pgs.
International Search Report and Written Opinion for International Application No. PCT/US2018/048954, Search completed Oct. 28, 2018, Mailed Nov. 15, 2018, 11 Pgs.
Alnis et al., "Thermal-noise-limited crystalline whispering-gallery-mode resonator for laser stabilization", Physical Review A, vol. 84, No. 011804(R), 2011, pp. 011804-1-011804-4, DOI: 10.1103/PhysRevA.84.011804.
Aranson et al., "The World of the Complex Ginzburg-Landau Equation", Reviews of Modern Physics, Jan. 2002, vol. 74, pp. 99-143, doi: 10.1103/RevModPhys.74.99.
Bale et al., "Dissipative dispersion-managed solitons in mode-locked lasers", Optics Letters, Nov. 1, 2009, vol. 34, No. 21, pp. 3286-3288, doi: 10.1364/OL.34.003286.
Bao et al., "Nonlinear conversion efficiency in Kerr frequency comb generation", Optics Letters, vol. 39, No. 21, 2014, pp. 6126-6129, http://dx.doi.org/10.1364/OL.39.006126.
Bao et al., "Stretched cavity soliton in dispersion-managed Kerr resonators", Physical Review A, Aug. 3, 2015, vol. 92, pp. 023802-1-023802-7, DOI: 10.1103/PhysRevA.92.023802.
Birch et al., "An Updated Edlén Equation for the Refractive Index of Air", Metrologia, Jan. 1993, vol. 30, No. 3, pp. 155-162, DOI: 10.1088/0026-1394/30/3/004.
Bobroff, "Recent advances in displacement measuring interferometry", Meas. Sci. Technol., 1993, vol. 4, No. 9, pp. 907-926.
Bolotin et al., "Ultrahigh electron mobility in suspended graphene", Solid State Communications, 2008, vol. 146, Issues 9-10, pp. 351-355, available online Mar. 6, 2008, doi: 10.1016/j.ssc.2008.02.024.
Bonaccorso et al., "Graphene photonics and optoelectronics", Nature Photonics, Sep. 2010, vol. 4, pp. 611-622, published online Aug. 31, 2010, DOI: 10.1038/nphoton.2010.186.
Brasch et al., "Photonic Chip Based Optical Frequency Comb Using Soliton Cherenkov Radiation", Science, Jan. 22, 2016, vol. 351, No. 6271, pp. 357-360, published online Dec. 31, 2015, doi: 10.1126/science.aad4811.
Capmany et al., "Microwave photonics combines two worlds", Nature Photonics, vol. 1, Jun. 1, 2007, pp. 319-330, DOI: 10.1038/nphoton.2007.89.
Chakraborty et al., "Gain modulation by graphene plasmons in aperiodic lattice lasers", Science, Jan. 15, 2016, vol. 351, Issue 6270, pp. 246-248, doi: 10.1126/science.aad2930.
Chembo et al., "Modal expansion approach to optical-frequency-comb generation with monolithic whispering-gallery-mode resonators", Physics Review A, 2010, vol. 82, pp. 033801-1-033801-18.
Chong et al., "All-normal-dispersion femtosecond fiber laser with pulse energy above 20 nJ", Optics Letters, Aug. 15, 2007, vol. 32, No. 16, pp. 2408-2410, doi: 10.1364/OL.32.002408.

(56) References Cited

OTHER PUBLICATIONS

Ciddor et al., "Refractive index of air: new equations for the visible and near infrared", Applied Optics, Mar. 20, 1996, vol. 35, No. 9, pp. 1566-1573, doi: 10.1364/AO.35.001566.
Cingoz et al., "Direct frequency comb spectroscopy in the extreme ultraviolet", Nature, Feb. 1, 2012, vol. 482, pp. 68-71.
Coddington et al., "Coherent Multiheterodyne Spectroscopy Using Stabilized Optical Frequency Combs", Physical Review Letters, Jan. 11, 2008, vol. 100, No. 1, pp. 013902-1-013902-4, DOI: 10.1103/PhysRevLett.100.013902.
Coddington et al., "Rapid and precise absolute distance measurements at long range", Nature Photonics, Jun. 2009, vol. 3, pp. 351-356, published online May 24, 2009, DOI: 10.1038/nphoton.2009.94.
Coen et al., "Modeling of octave-spanning Kerr frequency combs using a generalized mean-field Lugiato-Lefever model", Optics Letters, Jan. 2013, vol. 38, pp. 1-4, arXiv:1211.1697.
Coen et al., "Modulational Instability Induced by Cavity Boundary Conditions in a Normally Dispersive Optical Fiber", Physical Review Letters, vol. 79, No. 21, Nov. 24, 1997, pp. 4139-4142.
Coillet et al., "Azimuthal Turing Patterns, Bright and Dark Cavity Solitons in Kerr Combs Generated with Whispering-Gallery-Mode Resonators", IEEE Photonics Journal, Aug. 2013, vol. 5, No. 4, pp. 6100409-1-6100409-10, DOI: 10.1109JPHOT.2013.2277882.
Cole et al., "Soliton crystals in Kerr resonators", Nature Photonics, Sep. 25, 2017, vol. 11, pp. 671-676, DOI: 10.1038/s41566-017-0009-z.
Conforti et al., "Modulational instability in dispersion oscillating fiber ring cavities", Optical Letters, May 2014, vol. 39, pp. 4200-4203.
Cundiff et al., "Experimental evidence for soliton explosions", Physical Review Letters, Feb. 18, 2002, vol. 88, No. 7, pp. 073903-1-073903-4, doi: 10.1103/PhysRevLett.88.073903.
Saha et al., "Modelocking and femtosecond pulse generation in chip-based frequency combs", Optics Express, vol. 21, No. 1, Jan. 14, 2013, pp. 1335-1343.
Salem et al., "Application of space-time duality to ultrahigh-speed optical signal processing", Adv. Opt. Photon, 2013, vol. 5, Issue 3, pp. 274-317.
Schuhler et al., "Frequency-comb-referenced two-wavelength source for absolute distance measurement", Optics Letters, 2006, vol. 31, Issue 21, pp. 3101-3103, https://doi.org/10.1364/OL.31.003101.
Skryabin et al., "Looking at a soliton through the prisms of optical supercontinuum", Review of Modern Physics, vol. 82, Apr. 2010, pp. 1287-1299, arXiv:1005.2777 [physics.optics] May 16, 2010.
Solli et al., "Optical rogue waves", Nature, Dec. 13, 2007, vol. 450, pp. 1054-1057, doi: 10.1038/nature06402.
Song et al., "Impact of pulse dynamics on timing jitter in mode-locked fiber lasers", Optics Letters, May 2011, vol. 36, No. 10, 5 pgs.
Spencer et al., "An optical-frequency synthesizer using integrated photonics", Nature, 2018, vol. 557, pp. 81-85, https://doi.org/10.1038/s41586-018-0065-7.
Steinmetz et al., "Laser Frequency Combs for Astronomical Observations", Science, 2008, vol. 321, pp. 1335-1337.
Stern et al., "Battery-operated integrated frequency comb generator", Nature, Oct. 2018, vol. 562, No. 7727, pp. 401-405. Epub Oct. 8, 2018, doi: 10.1038/s41586-018-0598-9.
Suh et al., "Microresonator soliton dual-comb spectroscopy", Science, Nov. 4, 2016, vol. 354, Issue 6312, pp. 600-603, DOI: 10.1126/science.aah6516, arXiv:1607.08222, Jul. 27, 2016.
Suh et al., "Soliton Microcomb Range Measurement", Science, Jun. 28, 2017, vol. 359, pp. 884-887, arXiv:1705.06697.
Tamura et al., "77-fs pulse generation from a stretched-pulse mode-locked all-fiber ring laser", Optics Letters, 1993, vol. 18, No. 13, pp. 1080-1082, doi: 10.1364/OL.18.001080.
Trocha et al., "Ultrafast Optical Ranging Using Microresonator Soliton Frequency Combs", Science, Feb. 23, 2018, vol. 359, pp. 887-891.

Udem et al., "Optical frequency metrology", Nature, Mar. 14, 2002, vol. 416, pp. 233-237.
Vakil et al., "Transformation optics using graphene", Science, Jun. 10, 2011, vol. 332, Issue 6035, pp. 1291-1294.
Van Den Berg et al., "Many-wavelength interferometry with thousands of lasers for absolute distance measurement", Physical Review Letters, May 4, 2012, vol. 108, No. 18, pp. 183901-1-183901-5, DOI:10.1103/PhysRevLett.10/.183901.
Wabnitz, "Suppression of interactions in a phase-locked soliton optical memory", Optics Letters, Apr. 15, 1993, vol. 18, No. 8, pp. 601-603.
Wang et al., "Absolute positioning by multi-wavelength interferometry referenced to the frequency comb of a femtosecond laser", Optics Express, Apr. 6, 2015, vol. 23, No. 7, pp. 9121-9129, first published Apr. 1, 2015, doi: 10.1364/OE.23.009121.
Wang et al., "Gate-Variable Optical Transitions in Graphene", Science, Apr. 11, 2008, vol. 320, pp. 206-209.
Wei et al., "Precision and broadband frequency swept laser source based on high-order modulation-sideband injection-locking", Optics Express, vol. 23, No. 4, Feb. 23, 2015, pp. 4970-4980, see pp. 4970-4973.
Wirth et al., "Synthesized Light Transients", Science, vol. 334, Oct. 14, 2011, pp. 195-200.
Wu et al., "Dissipative soliton resonance in an all-normal-dispersion erbium-doped fiber laser", Optics Express, Mar. 30, 2009, vol. 17, No. 7, pp. 5580-5584, doi: 10.1364/OE.17.005580.
Wu et al., "Extremely high-accuracy correction of air refractive index using two-colour optical frequency combs", Scientific Reports, May 30, 2013, vol. 3, No. 1894, 5 pgs., DOI: 10.1038/srep01894.
Wu et al., "Generation of cascaded four-wave-mixing with graphene-coated microfiber", Photon. Res., Apr. 2015, vol. 3, No. 2, pp. A64-A68, https://dx.doi.org/10.1364/PRJ.3.000A64.
Xu et al., "Holey graphene frameworks for highly efficient capacitive energy storage", Nature Communications, Aug. 8, 2014, vol. 5, Article No. 4554, pp. 1-8, doi: 10.1038/ncomms5554.
Xuan et al., "High-Q silicon nitride microresonators exhibiting low-power frequency comb initiation", Optica, 2016, vol. 3, No. 11, 1171-1180.
Xue et al., "Mode-locked dark pulse Kerr combs in normal-dispersion microresonators", Nature Photonics, Aug. 10, 2015, vol. 9, pp. 594-600, doi: 10.1038/nphoton.2015.137.
Yang et al., "Counter-propagating solitons in microresonators", Nature Photonics, 2017, vol. 11, pp. 560-564, arX14:1704.08409, May 2, 2017.
Yang et al., "An all-optical modulation method in sub-micron scale", Scientific Reports, Mar. 17, 2015, vol. 5, No. 9206, pp. 1-5, doi: 10.1038/srep09206.
Yang et al., "Stokes solitons in optical microcavities", Nature Physics, Jan. 2017, vol. 13, pp. 53-58, published Sep. 5, 2016, DOI: 10.1038/NPHYS3875.
Yao et al., "Gate-tunable frequency combs in graphene-nitride microresonators", Nature, Jun. 21, 2018, vol. 558, pp. 410-414, https://doi.org/10.1038/s41586-018-0216-x.
Yao et al., "Graphene based widely-tunable and singly-polarized pulse generation with random fiber lasers", Scientific Reports, Dec. 21, 2015, vol. 5, No. 18526, pp. 1-8, doi: 10.1038/srep18526.
Yao et al., "Graphene Bragg gratings on microfiber", Optics Express, Oct. 6, 2014, vol. 22, No. 20, pp. 23829-23835, published Sep. 22, 2014, doi:10.1364/OE.22.023829.
Yariv et al., "Critical Coupling and Its Control in Optical Waveguide-Ring Resonator Systems", IEEE Photonics Technology Letters, Apr. 2002, vol. 14, No. 4, pp. 483-485.
Ye et al., "Femtosecond Optical Frequency Comb Technology", Springer, New York, NY, 2005, 370 pgs., (presented in two parts).
Yi et al., "Soliton frequency comb at microwave rates in a high-Q silica microresonator", Optica, Dec. 17, 2015, vol. 2, No. 12, pp. 1078-1085, doi: 10.1364/OPTICA.2.001078.
Yu et al., "Dispersion-managed soliton interactions in optical fibers", Optics Letters, 1997, vol. 22, No. 11, pp. 793-795, doi: 10.1364/OL.22.000793.
Zhang et al., "Generation of two-cycle pulses and octave spanning frequency combs in a dispersion-flattened micro-resonator", Optics Letters, Dec. 1, 2013, vol. 38, No. 23, pp. 5122-5125.

(56) References Cited

OTHER PUBLICATIONS

Zhou et al., "Stability and intrinsic fluctuations of dissipative cavity solitons in Kerr frequency micocombs", IEEE Photonics Journal, Jun. 2015, vol. 7, No. 3, 13 pgs.
Cundiff et al., "Optical arbitrary waveform generation", Nature Photonics, vol. 4, Nov. 2010, Published Online: Oct. 29, 2010, pp. 760-765, DOI:10.1038/NPHOTON.2010.196.
Das et al., "Monitoring dopants by Raman scattering in an electrochemically top-gated graphene transistor", Nature Nanotechnology, Apr. 2008, vol. 3, pp. 210-215, published online Mar. 30, 2008, doi: 10.1038/nnano.2008.67.
Del'Haye et al., "Full Stabilization of a Microresonator-Based Optical Frequency Comb", Physical Review Letters, Aug. 1, 2008, vol. 101, pp. 053903-1-053903-4.
Del'Haye et al., "Optical frequency comb generation from a monolithic microresonator", Nature, vol. 450, Dec. 20, 2007, pp. 1214-1217, arXiv:0708.0611, Aug. 4, 2007.
Del'Haye et al., "Phase Coherent Link of an Atomic Clock to a Self-Referenced Microresonator Frequency Comb", Nature, vol. 450, Dec. 20, 2007, 12 pgs.
Del'Haye et al., "Phase-coherent microwave-to-optical link with a self-referenced microcomb", Nature Photonics, Aug. 2016, vol. 10, pp. 516-520, published online Jun. 6, 2016, doi: 10.1038/nphoton.2016.105.
Diddams et al., "An Optical Clock Based on a Single Trapped 199Hg+ Ion", Science, Aug. 3, 2001, vol. 293, pp. 825-828.
Diddams et al., "Direct Link between Microwave and Optical Frequencies with a 300 THz Femtosecond Laser Comb", Physical Review Letters, May 29, 2000, vol. 84, No. 22, pp. 5102-5105.
Diddams et al., "Standards of Time and Frequency at the Outset of the 21st Century", Science, vol. 306, Nov. 19, 2004, pp. 1318-1324.
Doloca et al., "Absolute distance measurement system using a femtosecond laser as a modulator", Measurement Science and Technology, Sep. 24, 2010, vol. 21, No. 11, 115302, 7 pgs.
Du et al., "Tunability Analysis of a Graphene-Embedded Ring Modulator", IEEE Photonics Technology Letters, Oct. 15, 2014, vol. 26, No. 20, pp. 2008-2011.
Dudley et al., "Instabilities, breathers and rogue waves in optics", Nature Photonics, Sep. 28, 2014, vol. 8, pp. 755-764, doi: 10.1038/nphoton.2014.220.
Erkinatalo et al., "Cascaded Phase Matching and Nonlinear Symmetry Breaking in Fiber Frequency Combs", Physical Review Letters, Nov. 30, 2012, vol. 109, No. 2, first published Nov. 27, 2012, 223904-1-223904-5, doi: 10.1103/PhysRevLett.109.223904.
Ferdous et al., "Spectral line-by-line pulse shaping of on-chip microresonator frequency combs", Nature Photonics, vol. 5, Dec. 2011, Published Online: Oct. 9, 2011, pp. 770-776, DOI:10.1038/NPHOTON.2011.255.
Fescenko et al., "Dual-mode temperature compensation technique for laser stabilization to a crystalline whispering gallery mode resonator", Optics Express, vol. 20, No. 17, Aug. 13, 2012, pp. 19185-19193, published Aug. 6, 2012.
Gao et al., "Measurement technologies for precision positioning", CIRP Annals—Manufacturing Technology, 2015, vol. 64, Issue 2, pp. 773-796, available online Jun. 15, 2015, https://doi.org/10.1016/j.cirp.2015.05.009.
Giacomo, "News from the BIPM", Metrologia, 1984, vol. 20, No. 1, pp. 25-30.
Gilbert et al., "Hydrogen Cyanide H131C14N Absorption Reference for 1530 nm to 1565 nm Wavelength Calibration—SRM 2519a", NIST Special Publication 260-137, Aug. 2005, 29 pgs.
Godey et al., "Stability analysis of the spatiotemporal Lugiato-Lefever model for Kerr optical frequency combs in the anomalous and normal dispersion regimes", Physical Review A, 2014, vol. 89, pp. 063814-1-063814-21.
Gohle et al., "A frequency comb in the extreme ultraviolet", Nature, Jul. 14, 2005, vol. 436, pp. 234-237, doi: 10.1038/nature03851.
Grelu et al., "Dissipative solitons for mode-locked lasers", Nature Photonics, Feb. 1, 2012, vol. 6, pp. 84-92, doi: 10.1038/nphoton.2011.345.
Grigorenko et al., "Graphene plasmonics", Nature Photonics, Nov. 5, 2012, vol. 6, pp. 749-758, published online Oct. 31, 2012, doi: 10.1038/nphoton.2012.262.
Gu et al., "Regenerative oscillation and four-wave mixing in graphene optoelectronics", Nature Photonics, Aug. 2012, vol. 6, pp. 554-559, first published Jul. 15, 2012, doi: 10.1038/nphoton.2012.147.
Han et al., "Parallel determination of absolute distances to multiple targets by time-of-flight measurement using femtosecond light pulses", Optics Express, Oct. 5, 2015, vol. 23, No. 20, pp. 25874-25882, published Apr. 23, 20015, doi: 10.1364/OE.23.025874.
Hanson, "Dyadic Green's Functions and Guided Surface Waves for a Surface Conductivity Model of Graphene", Journal of Applied Physics, 2008, vol. 103, pp. 064302-1-064302-8, doi: 10.1063/1.2891452.
Haus et al., "Stretched-Pulse Additive Pulse Mode-Locking in Fiber Ring Lasers: Theory and Experiment", IEEE Journal of Quantum Electronics, Mar. 1995, vol. 31, No. 3, pp. 591-598, doi: 10.1109/3.364417.
Haus et al., "Structures for additive pulse mode locking", Journal of the Optical Society of America, Oct. 1991, vol. 8, No. 10, pp. 2068-2076, doi: 10.1364/JOSAB.8.002068.
Hendry et al., "Coherent Nonlinear Optical Response of Graphene", Physical Review Letters, Aug. 27, 2010, vol. 105, pp. 097401-1-097401-4, DOI: 10.1103/PhysRevLett.105.097401.
Herr et al., "Temporal solitons in optical microresonators", Nature Photonics, vol. 8, Feb. 2014, Published Online: Dec. 22, 2013, pp. 145-152, doi: 10.1038/nphoton.2013.343.
Herr et al., "Universal formation dynamics and noise of Kerr-frequency combs in microresonators", Nature Photonics, Jul. 2012, vol. 6, pp. 480-487, published online Jun. 24, 2012, doi: 10.1038/mphoton.2012.127.
Holzwarth et al., "Optical Frequency Synthesizer for Precision Spectroscopy", Physical Review Letters, vol. 85, No. 11, Sep. 11, 2000, pp. 2264-2267.
Huang et al., "A broadband chip-scale optical frequency synthesizer at 2.7 x 10-16 relative uncertainty", Sciences Advances, Apr. 22, 2016, vol. 2, e1501489, pp. 1-7.
Huang et al., "A low-phase-noise 18 GHz Kerr frequency microcomb phase-locked over 65 THz", Scientific Reports, Aug. 27, 2015, vol. 5, Issue 13355, pp. 1-7.
Huang et al., "Globally Stable Microresonator Turing Pattern Formation of Coherent High-Power THz Radiation On-Chip", Physical Review X, vol. 7, 2017, pp. 041002-1-041002-25.
Huang et al., "High-energy pulse synthesis with sub-cycle waveform control for strong-field physics", Nature Photonics, vol. 5, Aug. 2011, Published Online: Jul. 24, 2011, pp. 475-479, DOI: 10.1038/NPHOTON.2011.140.
Huang et al., "Mode-Locked Ultrashort Pulse Generation from On-Chip Normal Dispersion Microresonators", Physical Review Letters, Feb. 6, 2015, vol. 114, pp. 053901-1-053901-5, doi: 10.1103/PhysRevLett.114.053901.
Huang et al., "Phase stabilization of Kerr frequency comb internally without nonlinear optical interferometry", arXiv, Nov. 9, 2016, pp. 1-6, 9, 15-17.
Huang et al., "Smooth and Flat Phase-Locked Kerr Frequency Comb Generation by Higher Order Mode Suppression", Scientific Reports, May 16, 2016, vol. 6, Issue No. 1, pp. 1-7.
Huang et al., "Universally stable microresonator Turing pattern formation for coherent high-power THz radiation on-chip", 2016, arXiv:1603.00948, retrieved from https://www.semanticscholar.org/paper/Universally-stable-microresonator-Turing-pattern-Huang-Yang/da819648ba9b5225970c9d3cfd47fa716caf7a71, 26 pgs.
Ideguchi et al., "Coherent Raman spectro-imaging with laser frequency combs", Nature, Oct. 15, 2013, vol. 502, pp. 355-358.
Ilday et al., "Self-Similar Evolution of Parabolic Pulses in a Laser", Physical Review Letters, May 28, 2004, vol. 92, No. 21, pp. 213902-1-213902-4, doi: 10.1103/PhysRevLett.92.213902.
Jang et al., "Absolute Distance Meter Operating on a Free-Running Mode-Locked Laser for Space Mission", International Journal of Precise Engineering and Manufacturing, 2018, vol. 19, No. 7, pp. 975-981.

(56) References Cited

OTHER PUBLICATIONS

Jang et al., "Comb-referenced laser distance interferometer for industrial nanotechnology", Scientific Reports, Aug. 25, 2016, vol. 6, No. 31770, pp. 1-10, DOI: 10.1038/srep31770.

Jang et al., "Compensation of the refractive index of air in laser interferometer for distance measurement: A review", International Journal of Precision Engineering and Manufacturing, Dec. 2017, vol. 18, No. 12, pp. 1881-1890, DOI: 10.1007/s12541-017-0217-y.

Jin et al., "Absolute length calibration of gauge blocks using optical comb of a femtosecond pulse laser", Optics Express, Jun. 26, 2006, vol. 14, Issue 13, pp. 5968-5974, https://doi.org/10.1364/OE.14.005968.

Jones et al., "Carrier-Envelope Phase Control of Femtosecond Mode-Locked Lasers and Direct Optical Frequency Synthesis", Science, vol. 288, Apr. 28, 2000, pp. 635-639.

Joo et al., "Absolute distance measurement by dispersive interferometry using a femtosecond pulse laser", Optics Express, Jun. 26, 2006, vol. 14, No. 13, pp. 5954-5960.

Joo et al., "Distance measurements by combined method based on a femtosecond pulse laser", Optics Express, Nov. 24, 2008, vol. 16, No. 24, pp. 19799-19806, first published Nov. 14, 2008.

CHIP-SCALE FREQUENCY-COMB ASSISTED COHERENT LIDAR RANGING WITH SUB-MICROMETER PRECISION

CROSS-REFERENCE TO RELATED APPLICATIONS

The current application is a U.S. national phase of PCT Application No. PCT/US2019/060128 entitled, "Chip-Scale Frequency-Comb Assisted Coherent LIDAR Ranging With Sub-Micrometer Precision", filed Nov. 6, 2019, which claims the benefit of and priority under 35 U.S.C. § 119 (e) to U.S. Provisional Patent Application No. 62/756,506 entitled "Chip-Scale Frequency-Comb Assisted Coherent LIDAR Ranging With Sub-Micrometer Precision" filed Nov. 6, 2018. The disclosures of PCT Application No. PCT/US2019/060128 and U.S. Provisional Patent Application No. 62/756,506 are hereby incorporated by reference in their entirety for all purposes.

STATEMENT REGARDING FEDERALLY SPONSORED RESEARCH OR DEVELOPMENT

This invention was made with government support under Grant Numbers 1810506, 1824568, and 1433541, awarded by the National Science Foundation. The government has certain rights in the invention.

FIELD OF THE INVENTION

The present invention generally relates to chip-scale frequency-comb assisted coherent LIDAR ranging with sub-micrometer precision.

BACKGROUND OF THE INVENTION

Laser interferometry serves a fundamental role in science and technology, assisting with precision metrology and dimensional length measurements. During the past decade, frequency combs with traceability to time-frequency standards have contributed pivotal roles in dimensional metrology with ever-growing demands in measurement precision.

Light detection and ranging (LiDAR) is essential for science and technology as length is one of the seven fundamental physical quantities. The ability to precisely determine distance to a target is especially important for science and technology studies such as the Laser Interferometer Gravitational-Wave Observatory, futuristic space missions in the formation flying of multiple satellites for synthetic aperture imaging, and industrial large-scale manufacturing and axis control of precision machines. With the current international system of units (SI) definition of the meter based on the path traveled by light in vacuum during a time of 1/299,792,458 second, laser-based distance measurement has played a pivotal role for the advancement of length metrology with increasing precision. Most laser interferometers in science and technology are based on the singular wavelength, with interferometric phase measurement to achieve sub-wavelength precision. Inherently the single-wavelength laser interferometer measures distance by accumulating a displacement from initial to target position, with the non-ambiguity range bounded to half of the selected electromagnetic wavelength. To overcome this limitation, absolute distance measurement, which seeks to determine distance by a single operation, has been examined with various different approaches.

SUMMARY OF THE DISCLOSURE

Systems and methods for soliton microcomb-based precision dimensional metrology are disclosed. In an embodiment, a system for soliton microcomb-based precision dimensional metrology via spectrally-resolved interferometry, includes: a dual-pumped soliton microcomb generator comprising a pump, a microresonator, and an auxiliary pump and that generates a single-soliton microcomb; an erbium-doped fiber amplifier (EDFA) that amplifies a C-band section of the soliton microcomb; a non-polarizing beam splitter (BS) that divides the soliton microcomb pulses into a reference arm pulse and a measurement arm pulse for an interferometer and recombines the reference arm pulse and the measurement arm pulse into a recombined beam upon their return; a free-space collimator lens (CL); a reference mirror ($M_{REF}$); and a measurement mirror ($M_{MEA}$).

In a further embodiment, the microresonator is a planar waveguide $Si_3N_4$ microresonator, where a width of the microresonator is adiabatically varied to tune dispersion and improve single-mode mode locking.

In still a further embodiment, the measurement mirror ($M_{MEA}$) is mounted on a motorized stage for translation motion on a measurement path.

In still a further embodiment again, the pump laser is set to generate the single-soliton state with counter-clockwise propagation in the microresonator and the auxiliary pump laser wavelength is set for blue-detuning to thermally stabilize the microresonator with clockwise propagation.

In yet a further embodiment, the recombined beam is collimated into a single-mode fiber and sent to an optical spectrum analyzer.

In still a further embodiment again, the optical spectrum analyzer reads out a tooth-resolved and high-visibility interferogram.

In a further embodiment still, the C-band section ranges from 1530 nm to 1565 nm.

In still a further embodiment again, the non-polarizing beam splitter is a non-polarizing beam splitter with 50:50 dividing ratio that divides an 88.5 GHz soliton microcomb.

In yet a further embodiment, the soliton microcomb has a large free-spectral range of 88.5 GHz.

In still a further embodiment, further includes using homodyne interferometry to improve the distance metrology precision.

In another embodiment includes a method for soliton microcomb-based precision dimensional metrology via spectrally-resolved interferometry, including: generating a single-soliton microcomb using a dual-pumped soliton microcomb generator including a TE pump, a microresonator, and an TM auxiliary pump; amplifying a C-band section of the soliton microcomb using an erbium-doped fiber amplifier (EDFA); dividing, using a non-polarizing beam splitter (BS), the soliton microcomb pulses into a reference arm pulse and a measurement arm pulse for an interferometer and recombining the reference arm pulse and the measurement arm pulse into a recombined beam upon their return.

In a further embodiment, the microresonator is a planar waveguide $Si_3N_4$ microresonator, where a width of the microresonator is adiabatically varied to tune dispersion and improve single-mode mode locking.

In still a further embodiment, the measurement mirror ($M_{MEA}$) is mounted on a motorized stage for translation motion on a measurement path.

In still a further embodiment, the TE pump laser is set to generate the single-soliton state with counter-clockwise propagation in the microresonator and the TM auxiliary laser wavelength is set for blue-detuning to thermally stabilize the microresonator with clockwise propagation.

In still a further embodiment, the recombined beam is collimated into a single-mode fiber and sent to an optical spectrum analyzer.

BRIEF DESCRIPTION OF THE DRAWINGS

The description will be more fully understood with reference to the following figures and data graphs, which are presented as exemplary embodiments of the invention and should not be construed as a complete recitation of the scope of the invention.

DETAILED DESCRIPTION

Figure 1A:
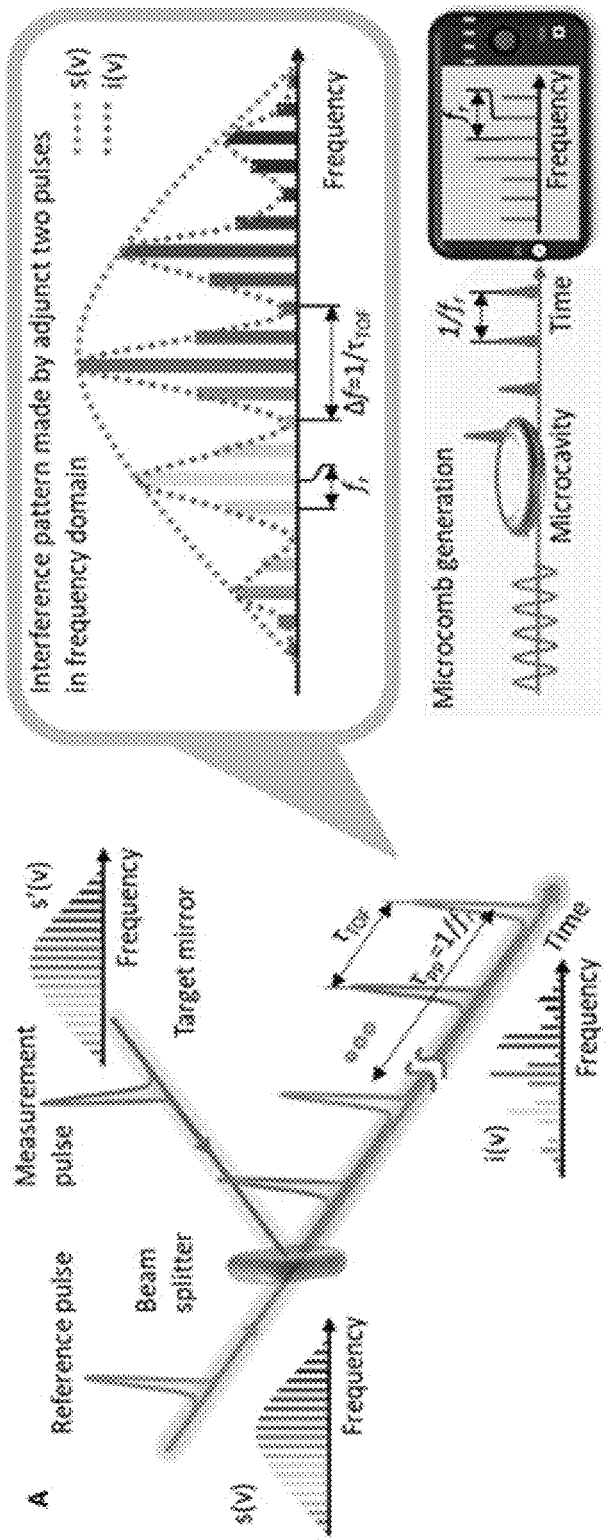
FIG. 1A illustrates an architectural approach of spectrally-resolved ranging via a soliton microcomb in accordance with an embodiment of the invention.

Turning now to the drawings, systems and methods in accordance with embodiments of the invention are disclosed for using a soliton microcomb for spectrally-resolved laser dimensional metrology. In many embodiments, the soliton microcomb is able to provide nanometric-scale precision. In many embodiments, the architectural setup of the soliton microcomb via spectrally-resolved interferometry may include a non-polarizing beam splitter, a reference mirror, a measurement mirror, an erbium-doped fiber amplifier, a free-space collimator lens. In several embodiments, the soliton microcomb may be a TE-TM dual-pumped soliton microcomb in accordance with an embodiment of the invention.

In many embodiments, a C-band section of the soliton comb can be first amplified with the erbium-doped fiber amplifier up to a certain mW threshold. In several embodiments, a non-polarizing beam splitter with 50:50 dividing ratio divides a 88.5 GHz soliton microcomb pulses into the reference and measurement arms for the interferometer and recombines upon the pulses return. In many embodiments, the measurement mirror can be mounted on a motorized stage for translational motion on the measurement path. In many embodiments, the recombined beam is collimated into a single-mode fiber, and sent into an optical spectrum analyzer. In many embodiments, since the microcomb may have a large free-spectral range of 88.5 GHZ, the comb tooth-resolved interferogram can be directly read out with the optical spectrum analyzer.

In general, spectral interferometry provides information on the optical time-of-flight, and many embodiments of the microcomb provide a large free-spectral range and high-coherence that enables tooth-resolved and high-visibility interferograms that may be directly read out by optical spectrum analyzers. Many embodiments employ an integrated time-of-flight signal from comb-line homodyne interferometry and microcomb spectrally-resolved interferometry, all from the same spectral interferogram. In many embodiments, the hybrid soliton and homodyne architecture demonstrates a minimal (e.g., 3 nm) repeatability achieved via homodyne interferometry, and over 1,000 seconds end-to-end stability in the long-term precision metrology. Discussed in detail below are various applications and laser ranging linearity in various example positional calibration and three-dimensional gauge block metrology.

In general, the advent of the laser frequency comb, a phase-locked series of optical frequency lines in the spectral domain and a mode-locked ultrafast pulse train in the time-domain, brought about a breakthrough in absolute distance measurements. The broad spectrum and ultrashort pulses in time domain of the frequency comb enabled advanced laser distance metrology, including dual-comb interferometry using temporal scanning of frequency comb pairs with slightly different repetition rates, synthetic wavelength interferometry using phase measurement of RF harmonics pulse repetition rates, spectrally-resolved interferometry by reading the interference pattern in optical frequency domain, multi-wavelength interferometry through multiple wavelengths to extend non-ambiguity range with resolution preserved at sub-wavelength levels, and cross-correlated time-of-flight measurements using the mode-locked frequency comb ultrashort pulses and extremely tight timing synchronization between pulse trains.

Furthermore, the frequency comb enables the whole optical frequency span to have traceability to well-defined frequency standards in the microwave or optical clock domains. Recently, chip-scale microcavities have contributed to the progress in laser frequency combs including the generation of a variety of frequency microcombs, temporal solitons, integrated low-power microcombs, and optical frequency synthesizers. These frequency microcombs enable applications such as low-noise microwave generation, optical communications, spectroscopy, and distance measurement at ≈100 nm precision.

Many embodiments provide for spectrally-resolved laser ranging via a soliton laser frequency microcomb, with precision length metrology at the few nanometers scale. In many embodiments, a single microcomb may be utilized, of which the spectrally-resolved interferometry (SRI) of the measurement and reference pulses from the same frequency microcomb engraves information on the optical time-of-flight. With a large (e.g., 88.5 GHZ) free-spectral range and high-coherence of a laser frequency microcomb, many embodiments directly readout the tooth-resolved and high-visibility interferogram via optical spectrum analyzers. Many embodiments utilize a dual-pumping technique to stably generate the soliton mode-locking in a planar waveguide $Si_3N_4$ microresonator. In many embodiments, to extend the absolute laser ranging non-ambiguity range, described in detail below is the time-of-flight signal reconstruction via an integrated platform of comb-line homodyne interferometry and microcomb and background amplified spontaneous emission spectrally-resolved interferometry, from the same spectral interferogram. The fine high-coherence homodyne interferometry can be unwrapped with the relatively-coarse microcomb, which is itself unwrapped with the low-coherence amplified spontaneous emission interferometry in the comb background to achieve a minimal, e.g., 3 nm, precision over a particular, e.g., 23 mm, non-ambiguity range.

In certain embodiments, the long-term distance metrology may be sampled over 1,000 seconds stability and an Allan deviation up to 100 seconds, with a 3 nm measurement repeatability achieved from homodyne interferometry. The soliton and homodyne single-microcomb architecture may be at the long-term white noise bounds and, for this focus on short-distance high-precision, even comparable to a few-Hz stabilized fiber mode-locked frequency comb for reference. Described below are applications and measurement linearity in examples of positional calibration and referenced against a 3D precision gauge block for principle demonstration.

Results

Figure 1B:
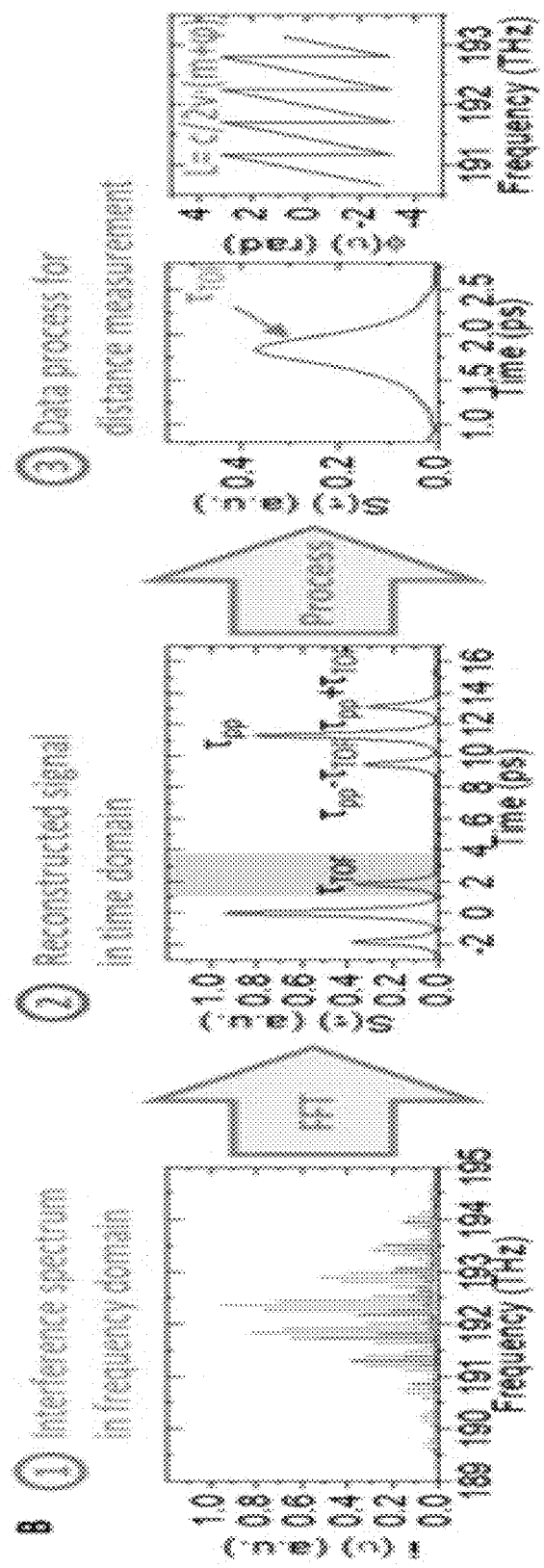
FIG. 1B illustrates an architectural approach of spectrally-resolved ranging via a soliton microcomb in accordance with an embodiment of the invention.

Measurement Concept of Soliton Microcomb Ranging by Spectrally-Resolved Interferometry Many embodiments provide for spectrally resolved laser dimensional metrology via a soliton microcomb, with nanometric-scale precision. FIG. 1A and FIG. 1B illustrate an architectural approach of the spectrally-resolved ranging via soliton micromb in accordance with an embodiment of the invention. In particular, FIG. 1A illustrates reference and measurement pulses of the soliton frequency comb, separated by $\tau_{TOF}$. The measurement pulse may have a relative phase shift $\phi(v)$ [$=2\pi v \times \tau_{TOF}$] to the reference pulse, and it makes an interference in every frequency mode of the soliton frequency comb. In many embodiments, the information of $\tau_{TOF}$ is thus engraved on the interference pattern in the frequency domain, monitored via the spectrometer. In many embodiments, the wide free-spectral range of frequency microcombs enables its comb-tooth resolved spectral interferogram to be directly read out by readily-available optical spectrum analyzers. FIG. 1B illustrates the spectral interference captured by the spectrum analyzer may then be Fourier-transformed to reconstruct the time-domain signal of the measurement and reference pulses in accordance with an embodiment of the invention. The left panel 1 illustrated in FIG. 1B illustrates an example experimental interference pattern in accordance with an embodiment of the invention.

The middle panel 2 illustrated in FIG. 1B illustrates the reconstructed time-domain signature $\tau_{PP}$ is the pulse-to-pulse temporal separation and a peak at $\tau_{TOF}$ is filtered via automatic peak finding for precise dimensional metrology in accordance with an embodiment of the invention. The right panel 3 illustrated in FIG. 1B illustrates the data processing for precise distance measurement in accordance with an embodiment of the invention.

With reference to FIG. 1A and FIG. 1B, the time-delayed measurement pulse can be described by a relative phase delay $\phi(v)$ ($=2\pi v \times \tau_{TOF}$) to the reference pulse, where v is the optical carrier frequency and $\tau_{TOF}$ the time-of-flight delay between the measurement and reference pulses. In many embodiments, with the pulse spectrum as s(v), the two separated pulses generate an interference pattern in frequency domain that can be expressed as i(v)=s(v) [1+cos $\phi(v)$]. In many embodiments, this interference pattern engraves the time delay with a period of $1/\tau_{TOF}$ in frequency domain as shown in the right panel of FIG. 1A, enabling the target distance/determination by $2\pi_{air}L=(c_o\tau_{TOF})$ where $c_o$ is speed of light in vacuum and $n_{air}$ is the medium refractive index. In many embodiments, the time delay $\tau_{TOF}$ is directly determined by the peak position of the Fourier-transform of i(v), expressed as:

$$I(\tau)=FT\{i(v)\}=S(\tau)\otimes[\delta(\tau+\tau_{TOF})/2+\delta(\tau)+\delta(\tau-\tau_{TOF})/2],$$

where $\delta(\tau)$ is the Dirac delta function, $S(\tau)$ is the Fourier transform of s(v), and $\tau$ represents the optical delay time variable. Since s(v) is a real function, its Fourier transform $S(\tau)$ is symmetric about $\tau=0$ and repeated every $\tau=\tau_{PP}$ ($=1/f_r$) as shown in the middle panel of FIG. 1B, where $f_r$ is the repetition rate and $\tau_{PP}$ is the pulse-to-pulse temporal separation.

In many embodiments, since the peak at $\tau_{TOF}$ is symmetrical to $\tau_{pp}/2$, the measured $\tau_{TOF}$ is folded at $\tau_{pp}/2$ and the measured distance has a triangle-shaped profile with increasing target distance. Considering this condition, the target distance can be expressed as $2n_{air}L=c_o(m\times\tau_{pp}/2+\tau_{TOF})$ for even number of m or $2n_{air}L=c_o\{(m+1)\times\tau_{pp}/2-\tau_{TOF}\}$ for odd number of m, where m is an integer value. In general, the directly calculated $\tau_{TOF}$ from the peak detection of $S(\tau)$ may not be precisely determined and can be limited by the bandwidth of s(v). Accordingly, many embodiments may use the curve fitting algorithm for precision peak detection and homodyne interferometry toward nanometer-level precision. Further details are described below in Section S1. In many embodiments, the non-ambiguity range $(L_{NAR})$ is determined inversely from $f_r$ [$L_{NAR}=c/(4f_r)$] which, for example, for a 88.5 GHz soliton microcomb, corresponds to 850 μm. For even more precise distance measurement, many embodiments may use the interferometric phase of the optical carrier from the inverse Fourier transformation of $S(\tau)$. Then the target distance can be defined as:

$$2n_{air}L=c_o/v(M_{homodyne}+\phi(v)),$$

where $M_{homodyne}$ is the integer number of the homodyne interferometry.

In many embodiments, a dissipative single soliton is generated in a planar waveguide $Si_3N_4$ microresonator, which has a loaded quality factor $Q$ of $1.77\times10^6$, a free spectral range (FSR) of 88.5 GHZ, and an anomalous group velocity dispersion $\beta_2$ of $-3\pm1.1$ $fs^2$/mm at 1595 nm. The single-soliton frequency comb mode-locking may be achieved with a counter-propagating dual-driven technique for stable generation (see e.g., FIG. 2A left inset). FIG. 2B illustrates an example of a generated single soliton frequency comb, formed as a localized attractor in the microresonator with Kerr nonlinearity compensated by the cavity anomalous dispersion and the cavity loss balanced by the microresonator parametric gain in accordance with an embodiment of the invention. In many embodiments, the microresonator laser frequency comb may have a hyperbolic secant-square shape with a center wavelength of 1595 nm and a 40 nm bandwidth.

Figure 2A:
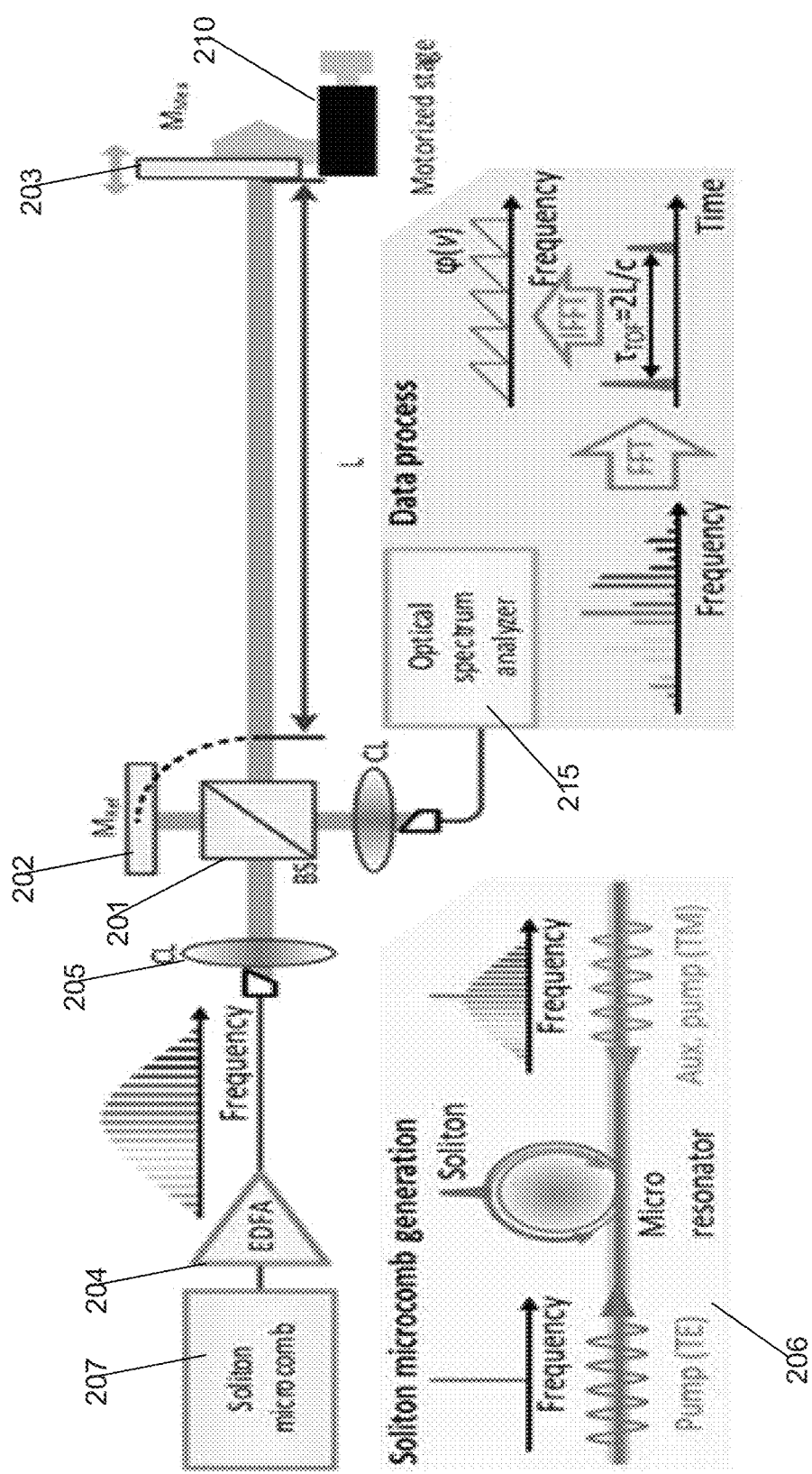
FIG. 2A illustrates an architectural setup of soliton microcomb based precision dimensional metrology via spectrally-resolved interferometry in accordance with an embodiment of the invention.
Figure 2B:
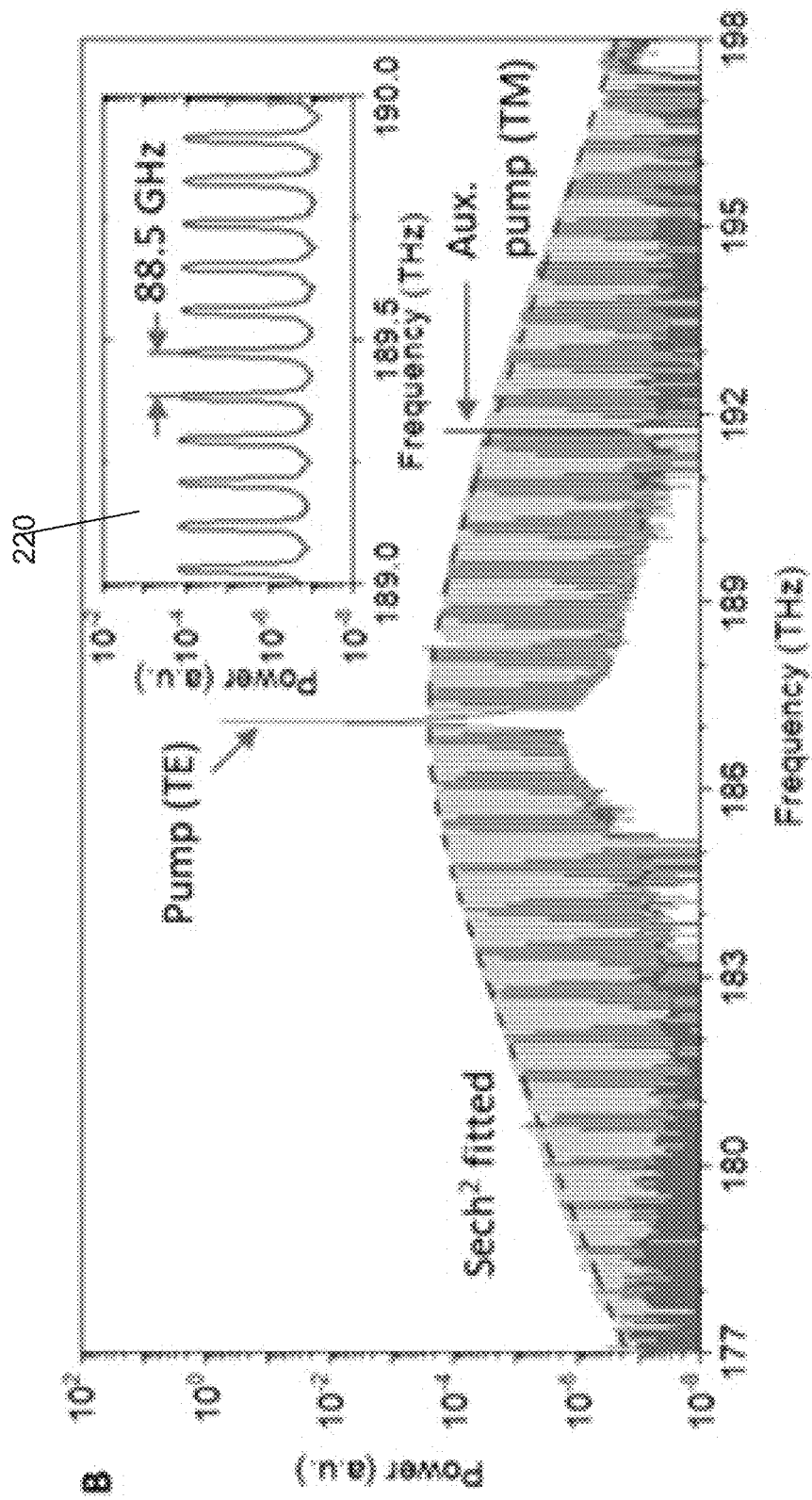
FIG. 2B illustrates an example of optical spectrum of a soliton microcomb from a high-Q $Si_3N_4$ microcavity, with a hyperbolic secant-square spectrum in accordance with an embodiment of the invention.
Figure 2C:
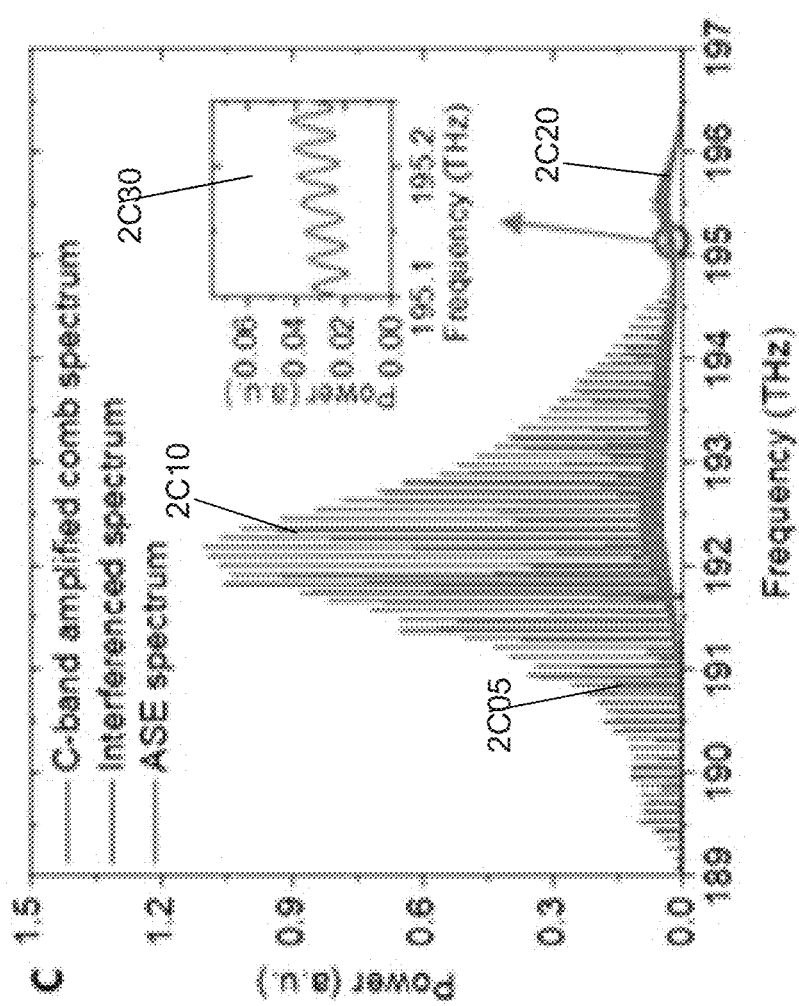
FIG. 2C illustrates an example measured high-coherence spectral interferogram from reference and measurement pulses, along with a superimposed spectra of the C-band amplified soliton microcosm in accordance with an embodiment of the invention.

In particular, FIG. 2A-2C illustrate a soliton microcomb-based precision dimensional metrology and a setup for the precise dimensional measurement with the soliton microcomb in accordance with an embodiment of the invention. In particular, FIG. 2A illustrates a soliton microcomb-based precision dimensional metrology via spectrally-resolved interferometry. As illustrated in FIG. 2A, this may include BS: non-polarizing beam splitter 201, $M_{REF}$: reference mirror 202, $M_{MEA}$: measurement mirror 203, EDFA: erbium-doped fiber amplifier 204, CL: free-space collimator lens 205. The left inset 206 illustrated in FIG. 2A illustrates a schematic for the TE-TM dual-pumped soliton microcomb generation 207 in accordance with an embodiment of the invention.

In particular, FIG. 2A illustrates a free-space Michelson interferometer setup for absolute distance measurement in accordance with an embodiment of the invention. In many embodiments, a C-band (e.g., 1530 nm to 1565 nm) section of the soliton comb 207 can be first amplified with an erbium-doped fiber amplifier 204 up to 10 mW, centered at 1561.4 nm (192 THz) with 16 nm (2 THz) bandwidth. In several embodiments, a non-polarizing beam splitter 201 with 50:50 dividing ratio divides the 88.5 GHz soliton microcomb pulses into the reference and measurement arms for the interferometer and recombines upon the pulses return. In many embodiments, the measurement mirror ($M_{MEa}$) 203 can be mounted on a motorized stage 210 for translational motion on the measurement path. In many embodiments, the recombined beam is collimated into a single-mode fiber, and sent into an optical spectrum analyzer 215 with 50 pm resolution and 10 pm accuracy, which corresponds to a fractional value of $6.3 \times 10^{-6}$. An example resulting spectral interference pattern in accordance with an embodiment of the invention is shown in the blue color plot of FIG. 2C. In many embodiments, since the microcomb has a large free-spectral range of 88.5 GHZ, the comb tooth-resolved interferogram can be directly read out with optical spectrum analyzer. In contrast, conventional fiber laser frequency combs rely on Fabry-Perot etalon-based mode filtering or specialized virtually-imaged phase array spectrometers for comb tooth-resolved spectrograms. FIG. 2C illustrates the background gray spectrum 2C10 is the amplified C-band section of the original soliton microcomb shown for reference in accordance with an embodiment of the invention. Although FIG. 2A illustrates a particular setup for a soliton microcomb-based precision dimensional metrology, any of a variety of setups, including different schematics for the TE-TM dual-pumped soliton microcomb generation, may be utilized as appropriate to the requirements of specific applications in accordance with embodiments of the invention.

FIG. 2B illustrates an optical spectrum of the soliton microcomb from the high-Q $Si_3N_4$ microcavity, with the hyperbolic secant-square spectrum in accordance with an embodiment of the invention. The inset 220 illustrated in FIG. 2B illustrates a zoom-in illustration of the comb-tooth resolved spectrum in accordance with an embodiment of the invention. FIG. 2C illustrates an example measured high-coherence spectral interferogram (blue) 2C05 from the reference and measurement pulses, along with the superimposed spectra of the C-band amplified soliton microcomb (gray) 2C10 in accordance with an embodiment of the invention. Pink line 2C20 shows the amplified spontaneous emission (ASE) noise induced by the EDFA from the same spectral interferogram of the blue line in accordance with an embodiment of the invention. The inset 2C30 illustrated in FIG. 2C illustrates a zoom-in illustration of the low-coherence ASE spectral interferogram with the low-visibility interference in accordance with an embodiment of the invention.

Figure 3A:
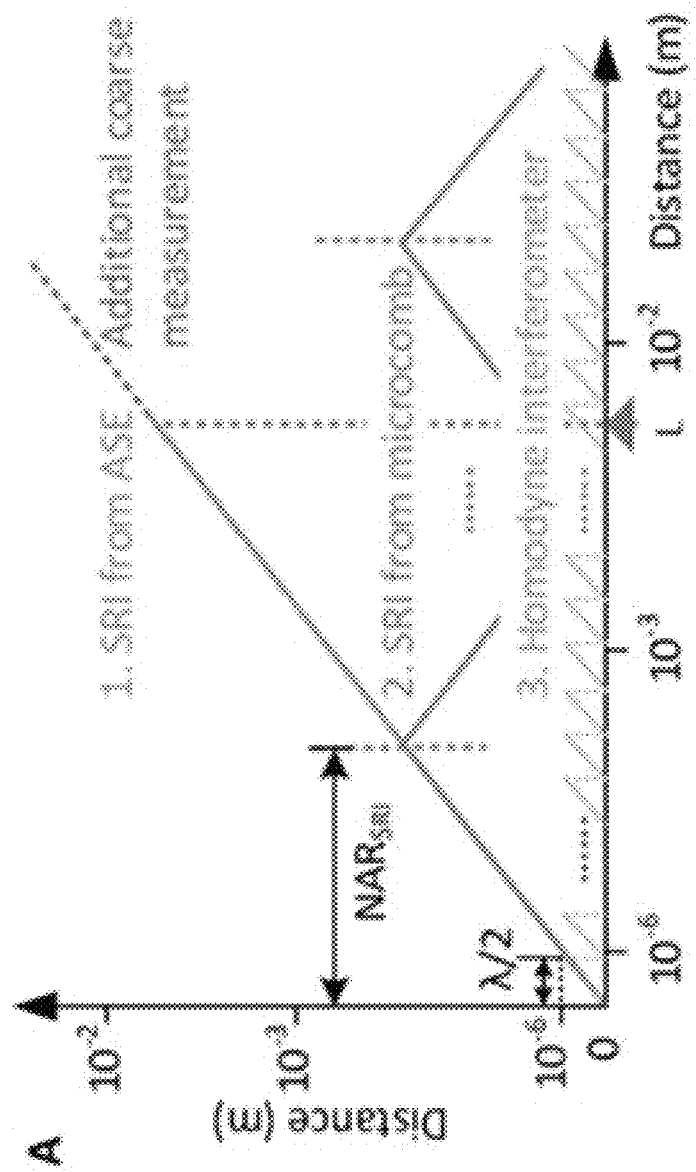
FIG. 3A-3C illustrates measurement linearity and distance measurement beyond the non-ambiguity range in accordance with an embodiment of the invention.
Figure 3B:
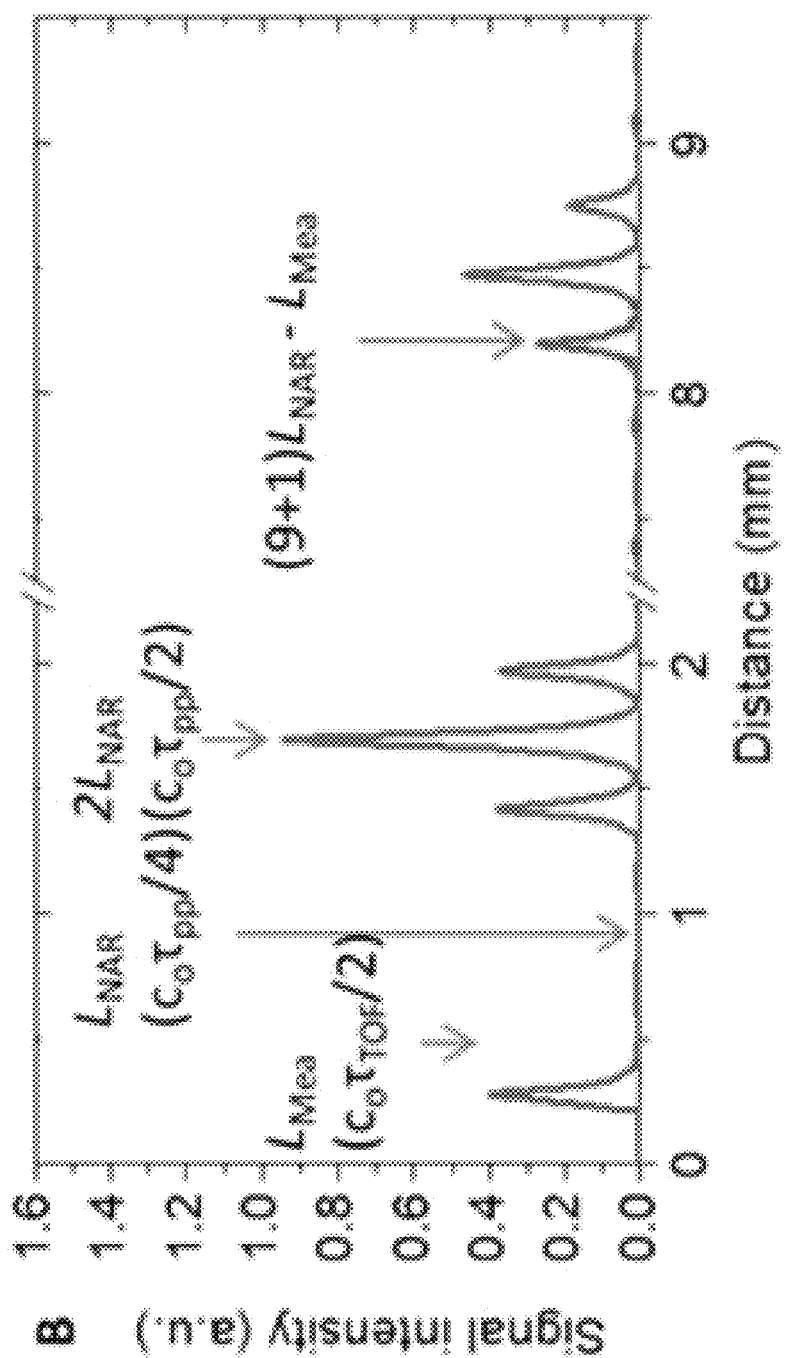
Figure 3C:
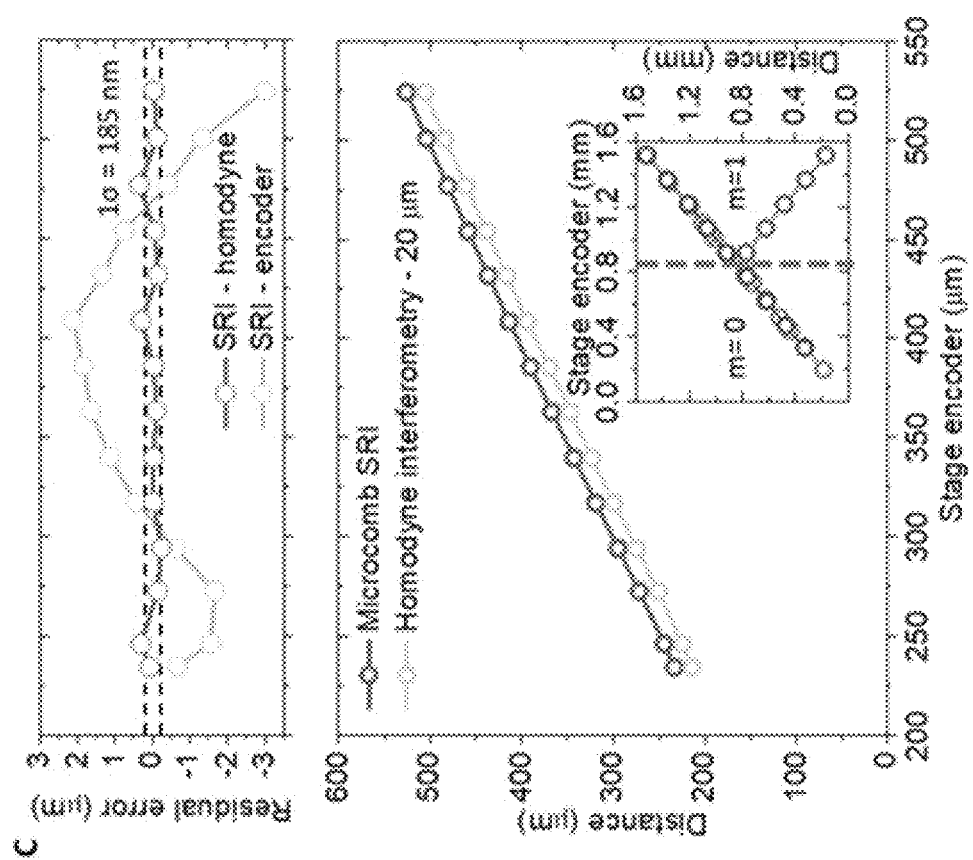

Absolute Distance Measurement by Soliton Microcomb-Based Spectrally-Resolved Interferometry To evaluate measurement reliability, many embodiments measured a fixed distance over particular duration (e.g., 1,000 seconds) with a particular update rate (e.g., update rate of 1 s). The refractive index of air during the measurement may be assumed at 1.000247 using the empirical equation under standard air conditions. Since non-ambiguity range of microcomb-based SRI can be limited by few hundreds of micrometer, many embodiments extend the non-ambiguity range by introducing coarse measurement from ASE spectrum-based SRI. Since the spectrometer resolution may be 50 pm ($\delta v_{spectrometer}$=6.14 GHz at 1560 nm), the maximum measurable range of ASE spectrum-based SRI ($L_{MAX\_ASE}$) is found to be 23.4 mm by relation of $L_{MAX\_ASE} = c_o / 2n\delta v_{spectrometer}$. In many embodiments, further extension of the measurement range can be realized by introducing other coarse distance metrology up to the coherence length of light source. FIGS. 3A-3C illustrates measurement linearity and distance measurement beyond the non-ambiguity range in accordance with an embodiment of the invention. In particular, FIG. 3A illustrates non-ambiguity range extension by the combined platform of ASE-noise-based spectral interferometry, soliton microcomb spectral interferometry and homodyne interferometry in accordance with an embodiment of the invention. In many embodiments, to determine integer M of the homodyne interferometry, the coarse distance measurement from the microcomb (with $\lambda/2$, where $\lambda = c_o/v$.) may be used. At the same time, to determine integer m of the microcomb, the ASE SRI may be used. FIG. 2B illustrates a time-domain signal reconstruction from the frequency domain interference in accordance with an embodiment of the invention. A typical signal-to-noise ratio of the time-domain signal may be larger than 100 (20 dB). FIG. 2C illustrates that measurement linearity is evaluated by measuring the target distance with 25 µm incremental translation of a motorized stage in accordance with an embodiment of the invention. The inset illustrated in FIG. 2C illustrates measured distance beyond the non-ambiguity range in accordance with an embodiment of the invention. In many embodiments, the wrapped distance is unwrapped with calculated non-ambiguity in green color. For comparison, a distance measurement from fiber-comb based spectrally-resolved interferometry is also plotted in light green color.

As illustrated in FIG. 3B, the target distance ($L_{Mea} = c_o \tau_{TOF}/2$) and non-ambiguity range ($L_{NAR} = c_o \tau_{PP}/4$) can be determined from the reconstructed time-domain signal, based on the Fourier transform of the interference pattern in the frequency domain in accordance with an embodiment of the invention. FIG. 3B illustrates the non-ambiguity range at 0.847424 mm in accordance with an embodiment of the invention. Furthermore, FIG. 3B illustrates a large peak enhanced by summation of the ASE spectrum and the microcomb spectrum, which can be used to extend the measurement range in accordance with an embodiment of the invention. As noted, in many embodiments, the measurement range can be further extended by combining additional coarse measurement up to the coherence length of the light source.

In many embodiments, the measurement linearity can be evaluated by comparing with the readout values of an encoder installed inside the motorized stage. The comparison between the stage encoder value and the SRI approach in accordance with many embodiments may be sampled every 25 µm step of the stage movement (averaged over 10 measurements) as shown in FIG. 3C. The measurement results revealed a peak-to-valley discrepancy of ±2.56 µm. The comparison result may be limited by the motorized stage due to its low accuracy (≈±5 µm) as described below in Section S5 below. For further comparison, the measurement results were compared between microcomb SRI and homodyne interferometry. In many embodiments, it is found to have a peak-to-valley discrepancy of ±293 nm and a standard deviation (1σ) of the residual value at 185 nm. The measurement of the translation motion exceeding the non-ambiguity range of 850 µm was also evaluated as shown in the inset of FIG. 3C in accordance with an embodiment of the invention, and no significant cyclic error was found. For comparison, the fiber comb-based SRI result is also plotted in the light cyan color. The integer value m is considered to unwrap the wrapped distance in green color, wherein the integer value m can be automatically determined via a coarse measurement scan. Beyond the non-ambiguity range, the unwrapped measurement and the stage encoder matches well within the position accuracy of the encoder readout. In many embodiments, through the SRI measurement, the position error of the stage encoder may also be determined by comparing the fiber comb with soliton microcomb SRI results. As described in Section S5 below, in many embodiments, the position error of the stage encoder is found to be ±5 µm within a 500 µm translation period. These results demonstrate that the microcomb SRI in accordance with many embodiments has a good potential for length and positioning calibration such as length standards and high-precision positioning for machine axis control. A cross-section of a standardized gauge block with 3 mm height was also measured to validate the microcomb SRI for potential 3D surface measurement. The measurement repeatability taken over 5 consecutive measurements is determined to be 327 nm and 11.4 nm from microcomb spectral resolved interferometer and homodyne interferometry, respectively as the 1σ standard deviation, as described in detail below in Section S6. In many embodiments, the soliton microcomb based SRI can be utilized for a variety of applications, including medical applications such as optical coherence tomography. In particular, as illustrated in FIG. 3, the extension of the ultrahigh-distance resolution (e.g., sub-20-nm) approach to longer distances, such as millimeter ranges, may be relevant to a variety of medical applications.

Figure 4A:
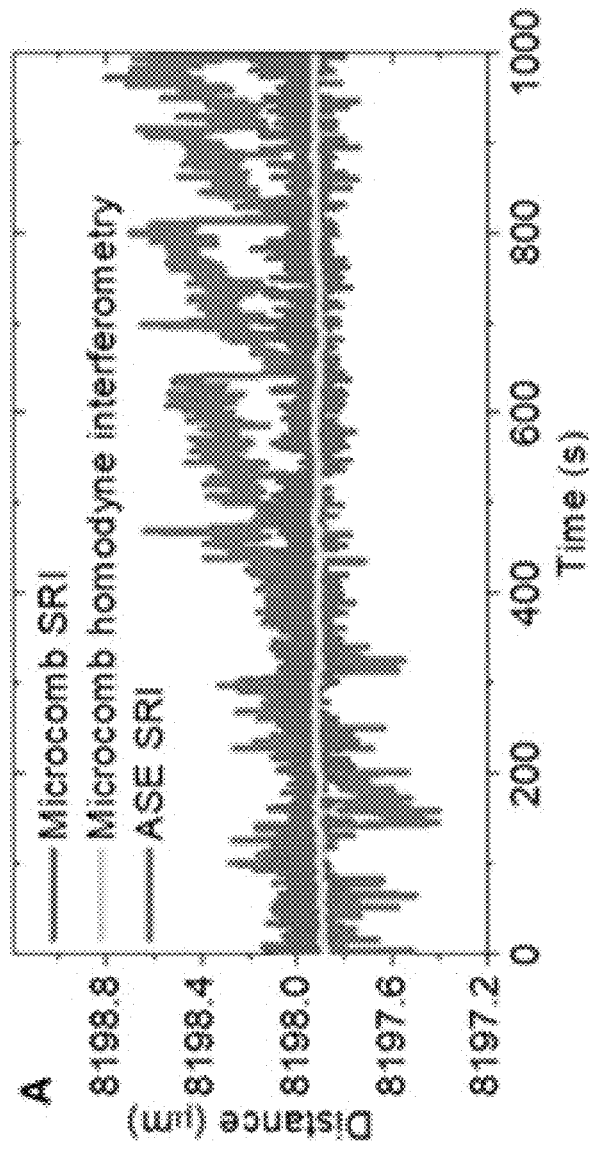
FIG. 4A-4C illustrates nanometer-scale precision distance measurement, reliability and repeatability evaluation in accordance with an embodiment of the invention.
Figure 4B:
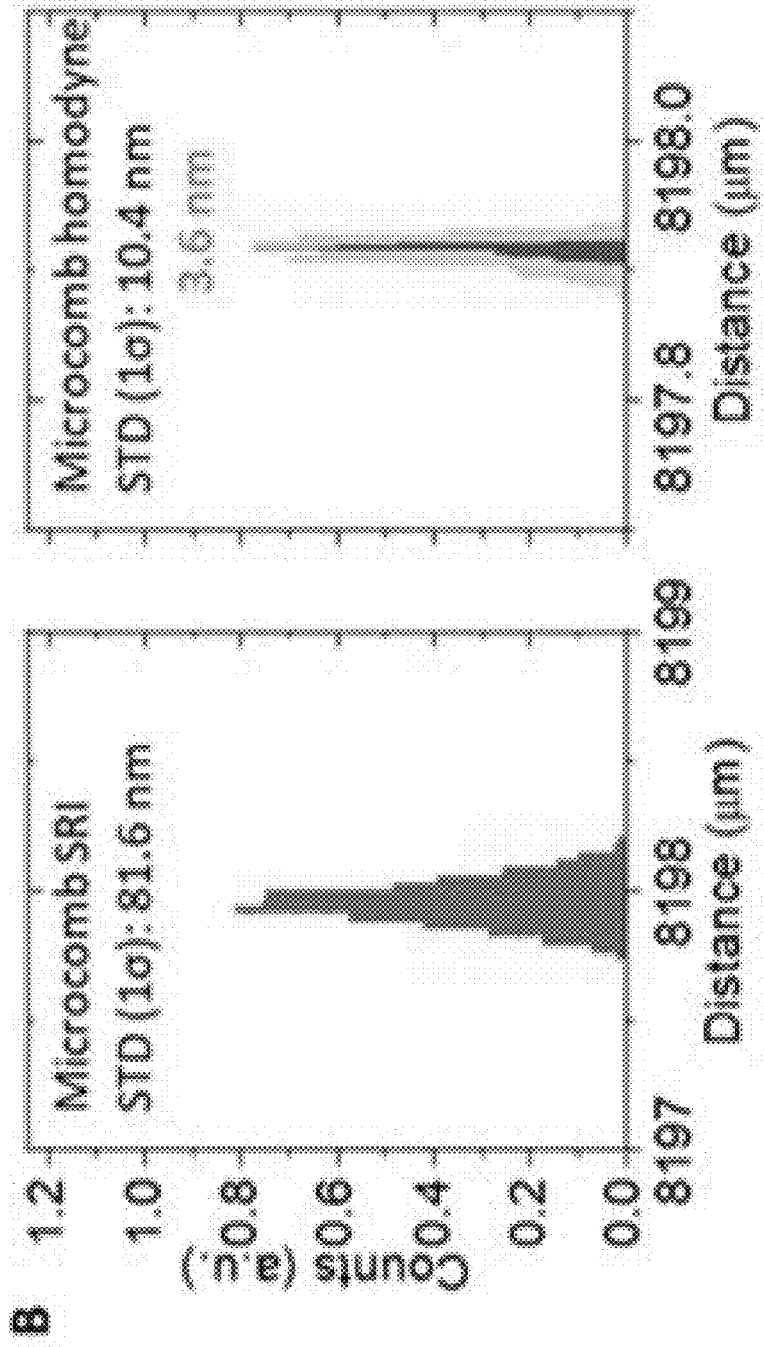
Figure 4C:
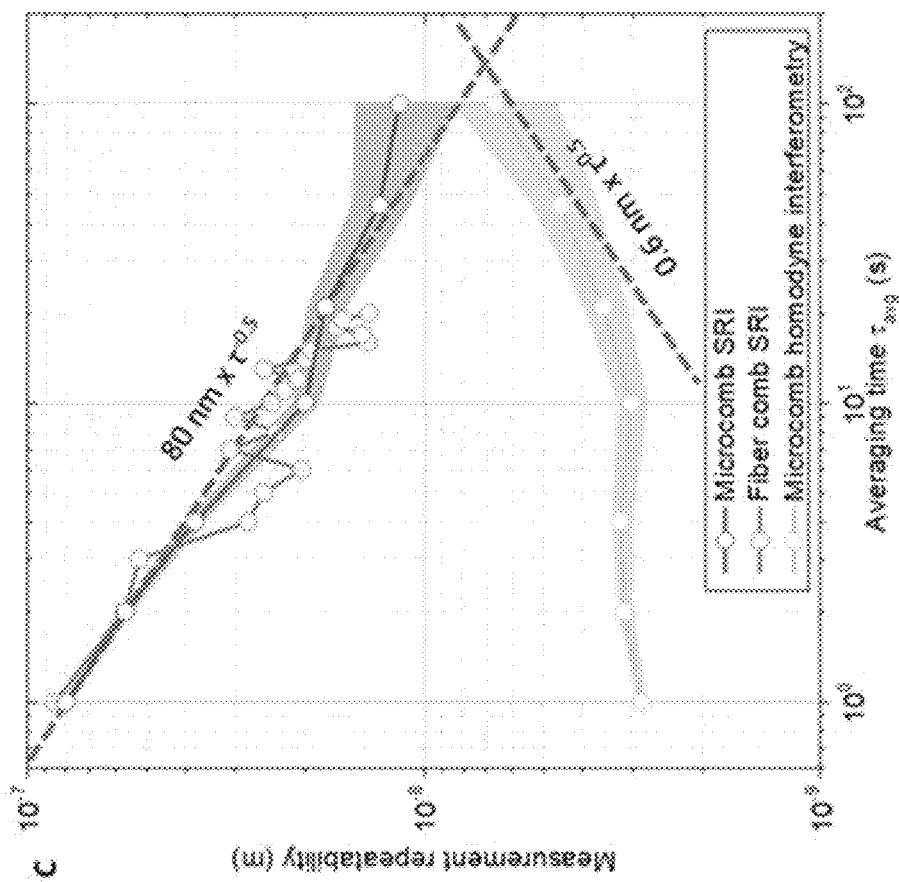

FIG. 4A-4C illustrate nanometer-scale precision distance measurement: reliability and repeatability evaluation in accordance with an embodiment of the invention. In particular, FIG. 4A illustrates a long-term distance metrology sampled over 1,000 seconds and plotted in the time-domain in accordance with an embodiment of the invention. FIG. 4B illustrates a histogram distribution of the microcomb spectral interferometry and homodyne interferometry, with 1σ standard deviation of 81.6 nm and 10.4 nm from the 1,000 seconds measurement respectively in accordance with an embodiment of the invention. The 3.6 nm standard deviation is an example obtained from 900 to 1,000 seconds. FIG. 4C illustrates measurement repeatability verification through Allan deviation of the long-term ranging data in accordance with an embodiment of the invention. In many embodiments, 3 nm measurement repeatability can be achieved from drift-compensated homodyne interferometry. The white noise limit is denoted by the dashed black line while flicker noise is not observed within the 100 seconds averaging time. Measurements from a few-Hz-stabilized fiber mode-locked laser frequency comb (Menlo Systems) laser metrology are illustrated for comparison.

As shown in FIGS. 4A and 4B in accordance with an embodiment of the invention, up to 1,000 seconds integration, the measured distance from microcomb SRI is nearly constant without notable long-term drifts and has a standard deviation (1σ) of 81.6 nm. In contrast, the ASE spectrum-based SRI shows large fluctuations in the distance measurement due to its incoherence, but aids to extend measurement range via non-periodicity in the time-domain (continuous-wave source). The ASE spectrum-based SRI measurement range is instead usually limited by the spectrometer optical resolution. An average value of the measured distance from microcomb-based SRI in accordance with an embodiment of the invention is found to be 8.197951 mm, and its accuracy is estimated to be about 52 nm and bounded by the optical spectrum analyzer. In many embodiments, the accuracy can be enhanced to almost the same level of its repeatability by precisely measuring the repetition rate $f_r$, instead of reading out solely the optical spectrum analyzer values. In several embodiments, measurement repeatability (in terms of Allan deviation) can be calculated from the long-term measurement as shown in FIGS. 4B and 4C in accordance with an embodiment of the invention. As noted in FIG. 4C, the measurement repeatability of a microcomb-based SRI in accordance with an embodiment of the invention at 1 s (without averaging) is found to be 80 nm. The measurement repeatability may gradually improve to 11 nm, with the measurement fitted relation of 80 nm$\times \tau_{avg}^{-0.5}$. For longer averaging times of more than 10 seconds, the measurement repeatability may remain below 20 nm.

Figure 9:
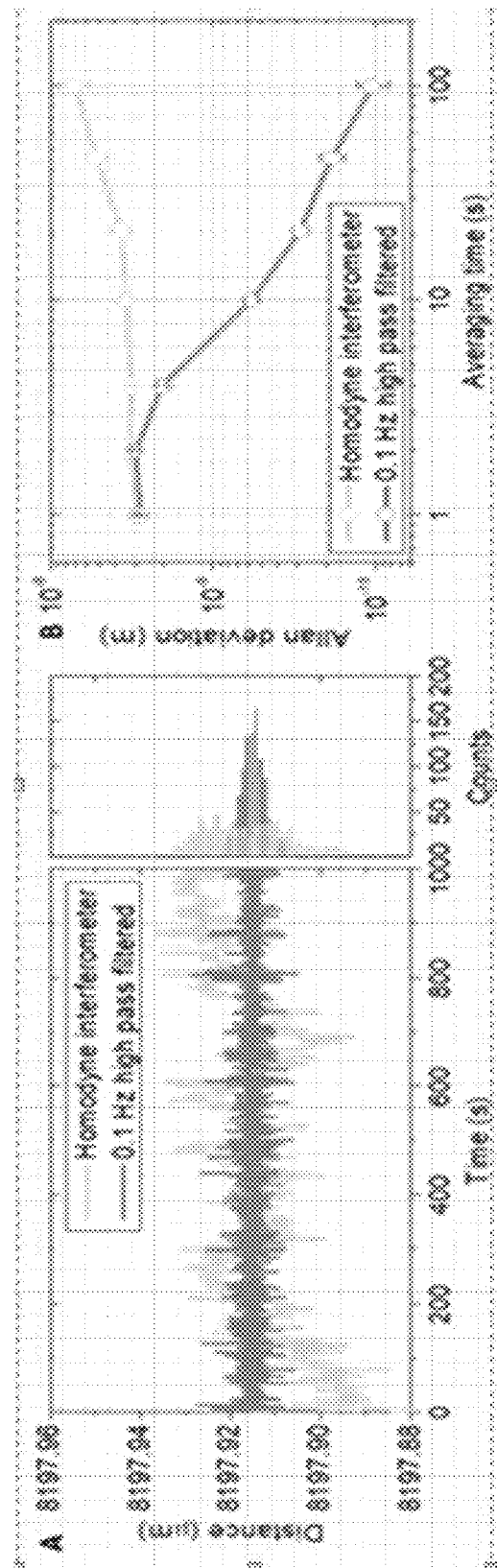
FIG. 9 illustrates evaluation of measurement repeatability of homodyne interferometry in accordance with an embodiment of the invention.

In many embodiments, homodyne interferometry provides a complementary approach to further improve the distance metrology precision at the nanometric level since it employs the optical carrier frequency, instead of the pulse train envelope and the RF repetition frequency in microcomb ranging. In many embodiments, using multiple comb lines, a comb-based homodyne interferometry may count the optical carrier phase and its measured distance has a standard deviation (1σ) of 10.4 nm during the 1,000 seconds integration time. Slowly-varying fluctuations (random walk) were observed as shown in FIGS. 4A and 4B in accordance with an embodiment of the invention. For specific ranges, such as 900 to 1,000 seconds in this case, the standard deviation improves to 3.6 nm. An average value of the measured distance from homodyne interferometry is found to be 8.197915 mm, in good agreement with the microcomb-based SRI. As shown in FIG. 4C in accordance with an embodiment of the invention, the measurement repeatability of homodyne interferometry at 1 second is found to be 2.85 nm which deteriorated to 6.62 nm at 100 seconds. The measurement repeatability of a microcomb-based SRI and homodyne interferometry in accordance with an embodiment of the invention may be overlapping at more than 100 seconds of averaging time because it may be perhaps bounded by slowly-varying fluctuations on the optical path delay due to thermal expansion on the measurement path, the air refractive index variations by slowly-varying environmental drift, or long-term fluctuations of the measured spectrum. In certain embodiments, if the long-term drift is removed using high-pass filtering on the measured distance data, the measurement stability can be enhanced to sub-nm level at 100 seconds averaging time as shown in FIG. 9 in accordance with an embodiment of the invention. A soliton microcomb stability measurements was compared with a fully-stabilized fiber frequency comb reference in the SRI, as described in detail below in Section S3. The measurement repeatability is well-matched between the stabilized fiber comb and the soliton microcomb, verifying that the measurement stability is not limited by the soliton microcomb in accordance with many embodiments of the invention. In addition, details of the intensity fluctuations on the measurement stability is further described in detail below in Section S2.

Figure 12:
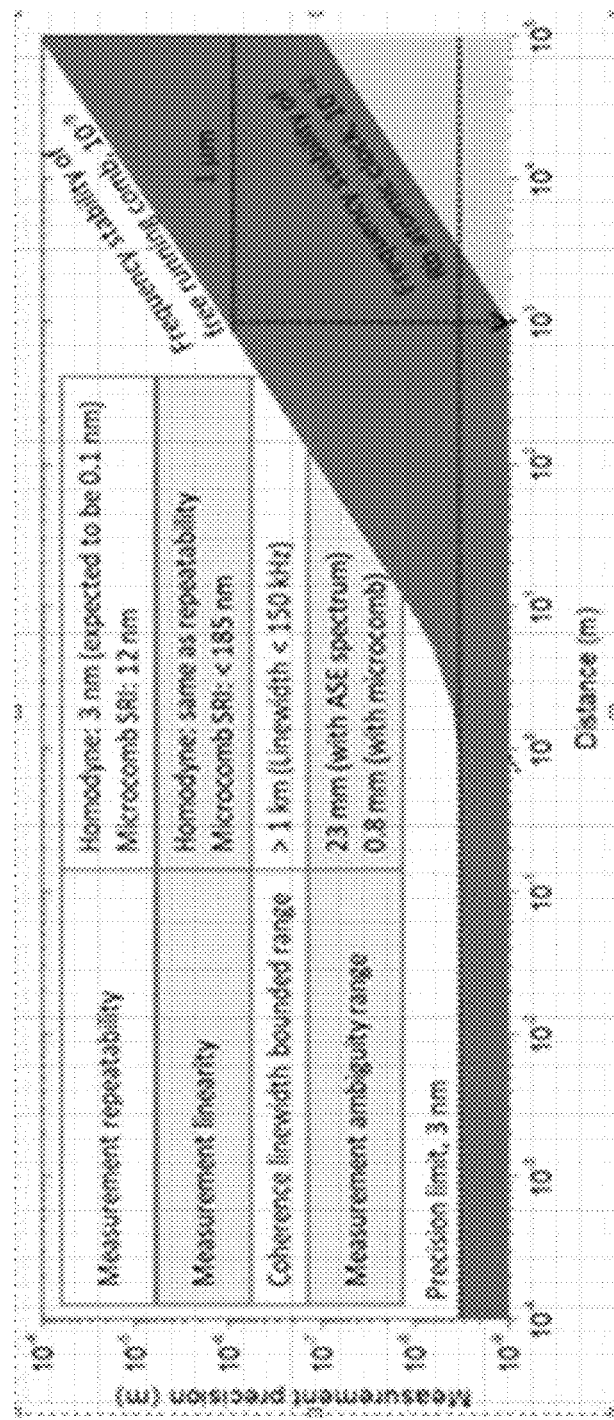
FIG. 12 illustrates metrology specifications and measurement repeatability scaling as a function of measurement range in accordance with an embodiment of the invention.

FIG. 12 illustrates the scaling of the microcomb SRI with estimates of the microcomb stability in accordance with many embodiments of the invention. For distances smaller than 1 m, the precision limit may be bounded by the measurement repeatability. For distances more than 1 m, the measurement precision may be bounded by the frequency stability of the free-running frequency microcomb which has been reported at the $10^{-9}$ level. The scaling may be square-root proportional with distance since for the longer distance the precision limit is bounded by the microcomb frequency instability ($\Delta f/f \sim \Delta L/L$). When locking a free-running comb to a Rb atomic clock, the frequency stability can be brought down to $10^{-12}$ at 100 seconds integration, further improving the long-distance precision.

In many embodiments, the spectrally-resolved interferometric approach may provide 3 nm measurement precision with a non-ambiguity range up to 23 mm in the free-running soliton laser frequency microcomb. With the proportional scaling to longer distances, the measurement precision may depend on the measurement range. In external field-operating scenarios, the air refractive index has an $\approx 10^{-6}$ level fluctuation in uncontrolled environments and can be compensated to the $10^{-8}$ level with well-defined empirical estimates or two-color interferometry. Assuming the air refractive index and target vibrations are negligible, then the dominant factor of the measurement imprecision may be the frequency instability ($\Delta f/f$) of laser frequency microcomb. The measurement range dependent imprecision ($\Delta L$) can thus be estimated by $\Delta L=[(3 \text{ nm})^2+\{(\Delta f/f)\times L\}^2]^{1/2}$. Considering the frequency instability of free-running soliton microcomb as $10^{-9}$ at 1 second, this corresponds to a measurement precision below 1 μm for a measurement range of 1 km. In many embodiments, the spectrally-resolved interferometry approach with both the soliton and comb-line homodyne interferometry can support distance measurements up to a kilometer or more, since the maximum measurable range ($L_{max}$) is bounded by the frequency comb coherence length.

In many embodiments, the soliton microcomb absolute ranging shows chip-scale precision dimensional measurement. Many embodiments may utilize the soliton single-microcomb as the laser source, which may have two major advantages in spectrally-resolved interferometry based dimensional metrology. Firstly, with the microchip enabling a large 88.5 GHz free-spectral range, the comb tooth-resolved spectral interferogram in accordance with many embodiments may be directly read out with readily-available commercial optical spectrum analyzers without optical mode filtering or dual-comb asynchronous sampling.

Secondly, the high-coherence in the mode-locked soliton state in accordance with many embodiments may enable high-visibility in the interference spectrum, and is combined with homodyne interferometry for enhanced (e.g., 3 nm) precision and with low-coherence amplified spontaneous emission spectrally-resolved interferometry for larger non-ambiguity ranges. The chip-scale laser frequency microcomb in accordance with many embodiments is also compact and implemented in a CMOS-compatible foundry for scaling. The long-term 1,000 second measurements, along with the positional linearity and gauge block reference studies, support the robustness of the measurement architecture in accordance with many embodiments of the invention. The soliton microcomb based spectral resolved interferometry in accordance with many embodiments provides a new platform in precision dimensional metrology, high-resolution biological sample depth imaging, and measurement for fundamental science and technology, including medical applications such an optical coherence tomography.

Materials and Methods

Planar Waveguide $Si_3N_4$ Microresonator Frequency Comb.

In many embodiments, the microresonator used for the single-soliton frequency comb generation may be based on stoichiometric silicon nitride. In several embodiments, the microresonator used for the single-soliton frequency comb generation may be based on stoichiometric silicon nitride with 261 μm outer radius and 800 nm thickness. In many embodiments, the loaded and intrinsic quality factors $Q$ are $1.77 \times 10^6$ and $3.4 \times 10^6$ respectively. In several embodiments, the microresonator width may be adiabatically varied from 1 to 4 μm to tune the dispersion and improve the single-mode mode-locking. In many embodiments, using swept-wavelength interferometry, the free spectral range (FSR) is found to be 88 GHz with an anomalous group velocity dispersion $\beta_2$ of $-3\pm1.1$ fs$^2$/mm.

Counter-Propagating Dual-Pump Technique.

Many embodiments may set the pump laser (e.g., New Focus TLB-6700) at 1595 nm with 23 dBm power and TE polarization. The auxiliary laser (e.g., Santec TSL-510) may be at 1565 nm with 33 dBm power and TM polarization. The pump laser may be set to generate the single-soliton state with counter-clockwise propagation in microresonator. The auxiliary laser wavelength may be set for effectively blue-detuning to thermally stabilize the planar waveguide Si3N4 microresonator with clockwise propagation, while the pump laser wavelength is set to generate the single-soliton state with counter-clockwise propagation in microresonator. The dual-driven counter-propagating technique may separate the thermal hysteresis from the Kerr soliton dynamics.

Single-Soliton Generation in Microresonator.

In many embodiments, a single soliton is deterministically generated by cascaded four-wave mixing in the planar waveguide $Si_3N_4$ microresonator via cross-polarized dual-driven approach. A 33-dBm TM auxiliary laser centered at 1560 nm may be sent into the $Si_3N_4$ microresonator, and slowly detuned into resonance. Then a 24-dBm TE pump can be sent into the microresonator in the counter propagation direction. With the thermal hysteresis compensation via the TM auxiliary laser, a single soliton state can be deterministically generated by tuning the TE pump wavelength to the effective red-detuning side of the pump cavity resonance.

Fundamental Minimum and Maximum Measurement Range.

In many embodiments, to determine a distance, the reference and measurement pulse should be separated in the time domain. The minimum measurable distance ($L_{min}$) can be determined by pulse duration used in the distance measurement. $L_{min}$ can be expressed as $L_{min}=c_o/(2\Delta v)$, where $\Delta v$ is a spectrum bandwidth. In certain embodiments, $L_{min}$ is estimated to be 30 μm considering 5 THz spectrum bandwidth of soliton microcomb. The fundamental maximum measurable distance ($L_{max}$) is upper-bounded by the coherence length of the light source and can be expressed as $L_{max}=c_o/(2\delta v)$, where $\delta v$ is the linewidth of the light source. In certain embodiments, the $L_{max}$ limit is estimated to be 1 km considering the 150 kHz linewidth of soliton microcomb (45).

Nonlinear Curve Fitting for Precise Peak Detection.

To precisely determine the peak position $\tau_{TOF}$ in time domain, many embodiments implement polynomial curve fitting near peak position as $I(\tau)=A\tau^2+B\tau+C$. In many embodiments, data points for curve fitting can be symmetrically chosen with 3 or 5 points around the peak position. The peak position may be determined when its first derivative is equal to zero as $dI(\tau)/d\tau=2A\tau+B=0$. Thus the peak position may be simply determined from $\tau=-B/2A$. (Detailed below in Section S1.)

Figure 5:
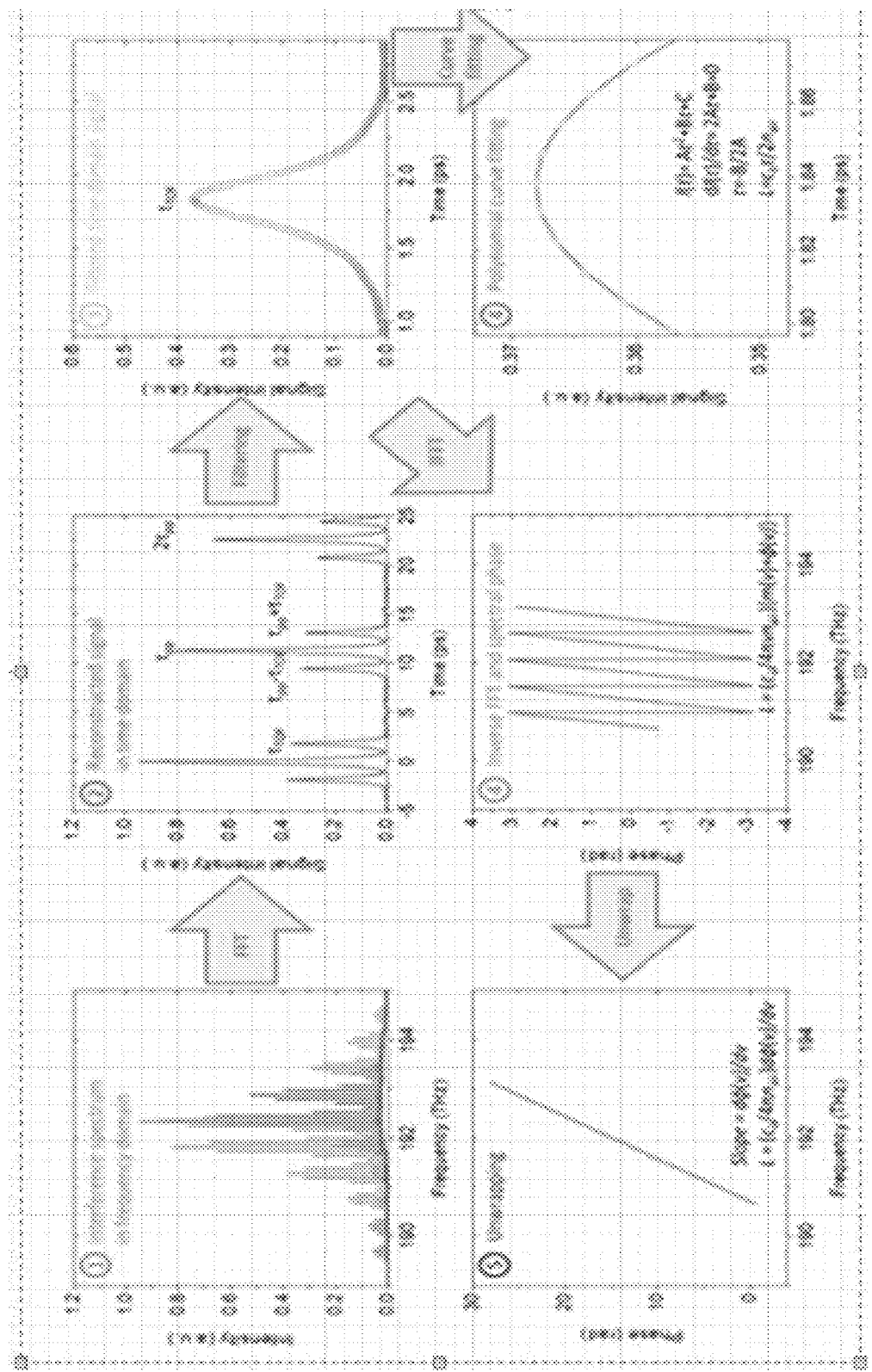
FIG. 5 illustrates a data process of spectrally-resolved interferometry in accordance with an embodiment of the invention.

Section S1. Data Processing for the Distance Metrology
S1.A. High precision Distance Measurement by Homodyne Detection from Microcomb Spectral Interferometry Spectrally-resolved interferometry has been described above to understand the frequency microcomb coherence. Multi-wavelength interference has also been described above for absolute distance metrology. For a distance metrology based on the microcomb-enabled spectral resolved interferometry in accordance with many embodiments of the invention, FIG. 5 illustrates further details on the data processing of several embodiments of the invention. In particular, FIG. 5 illustrates a data process of spectrally-resolved interferometry. The target distance may be determined by two steps. Firstly, time-domain peak detection can be used to coarse measurement. Secondly, spectral phase extracted from inverse FFT spectrum from time-domain signal may be used to homodyne interferometry for nanometric precision distance measurement. Alternatively, spectral phase slope can be also used to coarse measurement, since the first derivation of the phase delay for optical frequency v ($d\phi(v)/dv=2\pi\tau_{TOF}$) is proportional to $\tau_{TOF}$.

As noted above with reference to FIG. 5, firstly, the interference pattern in frequency domain can be recorded by optical spectrum analyzer (e.g., Yokogawa, AQ6370) with 8.6 THz bandwidth. The measured interference pattern ($i(v)= s(v) [1+\cos \phi(v)]$) shows sinusoidal modulated shape with period of $1/\tau_{TOF}$ in frequency domain due to optical carrier frequency depended relative phase delay ($\phi(v)=2\pi v\tau_{TOF}$). The frequency domain signal may be converted into time domain ($I(T)=FT\{i(v)\}=S(\tau)\otimes[\delta(\tau+\tau_{TOF})/2+\delta(\tau)+\delta(\tau-\tau_{TOF})/2]$) by Fourier transformation. To simply determine $\tau_{TOF}$, a position of maximum intensity can be chosen, however, its resolution is restricted by temporal resolution of Fourier transformation. In many embodiments, it can be enhanced by zero-padding techniques, however, it may require more computational time with increasing number of zero-padding points, and its effect is described below in Section S2. Alternatively, many embodiments may use nonlinear curve fitting to finely detect peak position of $\tau_{TOF}$ as described herein. However, in many embodiments, such envelope peak detection-based distance metrology may not support nanometric precision distance measurement. Consequently, to improve measurement precision, many embodiments may use homodyne detection from microcomb spectral interferometry. A filtered time domain signal near $\tau_{TOF}$ may be subsequently inverse-Fourier transformed back to the frequency domain as:

$$i'(v)=FT^{-1}\{S(\tau)\otimes\delta(\tau-\tau_{TOF})/2\}=[s(v)\exp\{i(2\pi\tau_{TOF}v)\}]/2=[s(v)\exp\{i\phi(v)\}]/2 \quad (1)$$

where $i=(-1)^{1/2}$.

This process allows the spectral phase $\phi(v)$ to be recovered. The spectral phase can be determined by the formula of $$\phi(v)=\tan^{-1}[\text{Im}\{s'(v)\}/\text{Re}\{s'(v)\}].$$

Then the target distance can be determined by $$L=c/2v\times\{M_{Homodyne}+\phi(v)\},$$

where $M_{Homodyne}$ is an integer value.

Since peak detection-based distance measurement may provide accurate distance to be enough to determine integer value $M_{Homodyne}$, many embodiments use a homodyne method with nanometric precision over long range.

S1.B. Comparison of Peak Detection Method

In many embodiments, a zero-padding technique makes Fourier-transformation data to be smoother. In many embodiments, if $\tau_{TOF}$ is determined by read out position of maximum intensity, its resolution is limited by 115 fs temporal resolution considering 8.6 THz of spectral range of measured optical spectrum. It means that measured distance is digitized with 115 fs temporal interval as shown in FIG. 6 item A.

Figure 6:
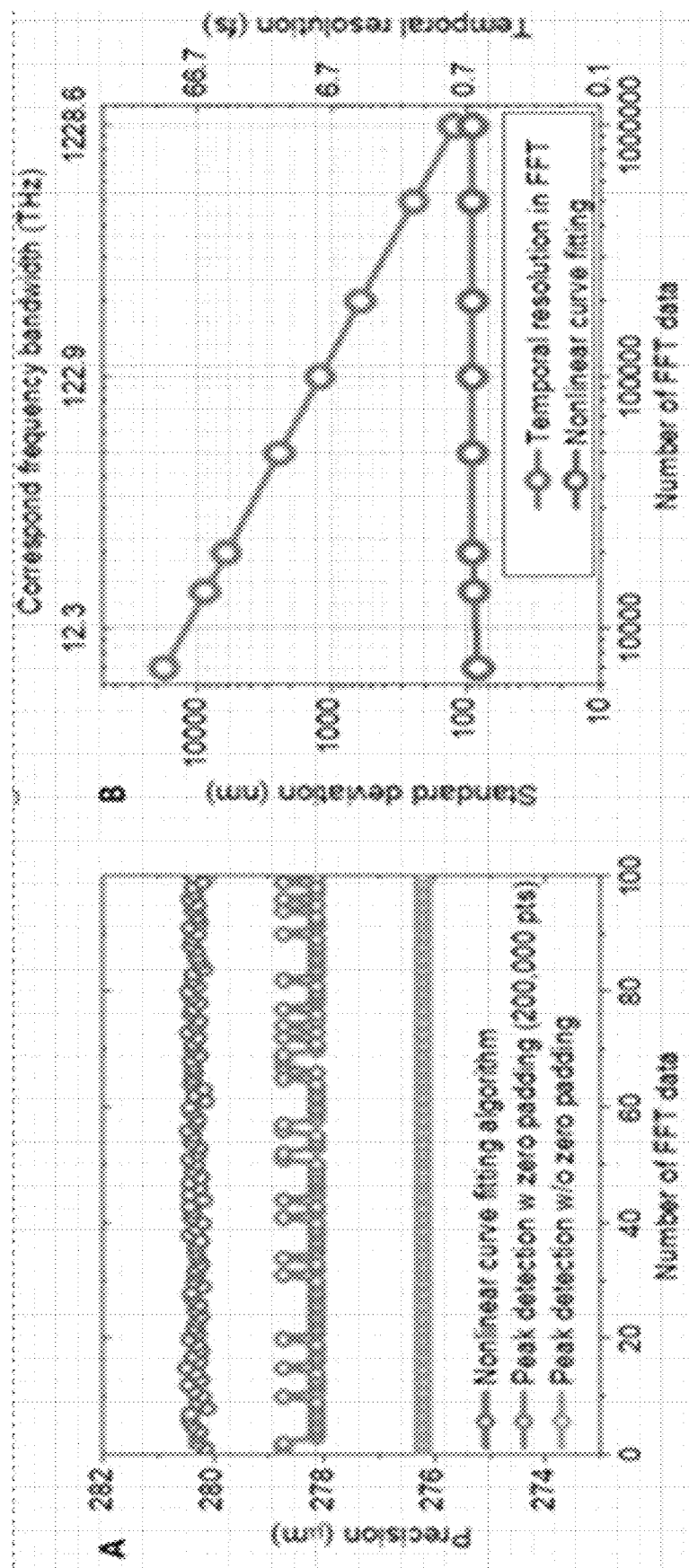
FIG. 6 illustrates precision comparison between peak detection and nonlinear curve fitting method in accordance with an embodiment of the invention.

In particular FIG. 6 illustrates precision comparison between peak detection and nonlinear curve fitting method in accordance with an embodiment of the invention. FIG. 6 item A illustrates time trace of peak detection and nonlinear curve fitting method. For peak detection method, two cases (with zero padding and without zero padding) are plotted. For nonlinear curve fitting method, zero padding may not be considered. Each result can be shifted about 2 μm for comparison. FIG. 6 item B illustrates measurement precision versus number of FFT data for zero padding in accordance with an embodiment of the invention.

In theory, the temporal resolution of Fourier transformation can be infinitely reduced, however, it comes with a large computational time to achieve high precision distance measurement. However, the measurement precision of nonlinear curve fitting method was found to be near 100 nm whether zero-padding is considered or not. Since the nonlinear curve fitting method does not need zero-padding for improvement of measurement precision, many embodiments may determine the distance using this approach. Furthermore, in many embodiments, spectral phase slope or cross-correlation methods can be also considered for high-precision peak detection.

Figure 7:
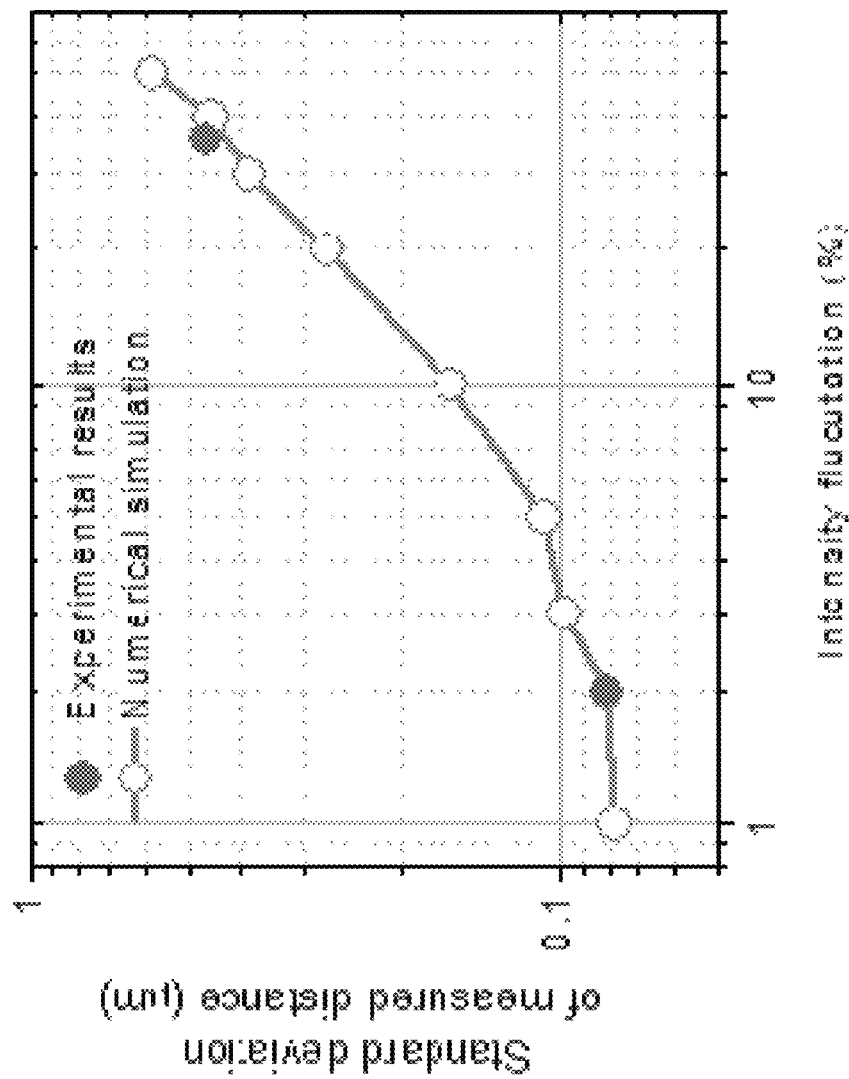
FIG. 7 illustrates intensity fluctuations effect on measurement precision in accordance with an embodiment of the invention.

Section S2. Characterization of Intensity Fluctuations on the Distance Metrology In many embodiments, intensity fluctuations during the measurement deteriorates the interference pattern in frequency domain, which worsens the measurement precision. To verify this influence, many embodiments measure the distance with low and high intensity fluctuation state of soliton microcomb and have numerical simulation. From the interference pattern recorded by optical spectrum analyzer, one of comb lines may be used to monitor the intensity fluctuation. Two cases are provided and the measurement results plotted with orange circle as illustrated in FIG. 6 in accordance with an embodiment of the invention. For 2% of intensity fluctuation, the standard deviation value of measured distance is found to be 81.6 nm as shown in FIG. 7 in in accordance with an embodiment of the invention. In particular, as illustrated in FIG. 7, the green color denotes numerical simulation results of intensity fluctuation induced measurement precision variation. Blue dot illustrated in FIG. 7 denotes two examples of the experimental results.

In certain embodiments, the standard deviation of measured distance is found to be 469 nm when intensity fluctuation is about 36%. To simulate this situation, one of the interference patterns in the frequency domain may be used and its intensity can be modulated by random fluctuation with range of 1% to 50%. Numerical simulation results is plotted in green color and it is quite well-matched with the experimental data. In many embodiments, the intensity fluctuations could be generated from the optical spectrum analyzer, the light source itself, polarization variation in the long fiber delay line, and also actual distance variations during measurement.

Figure 10:
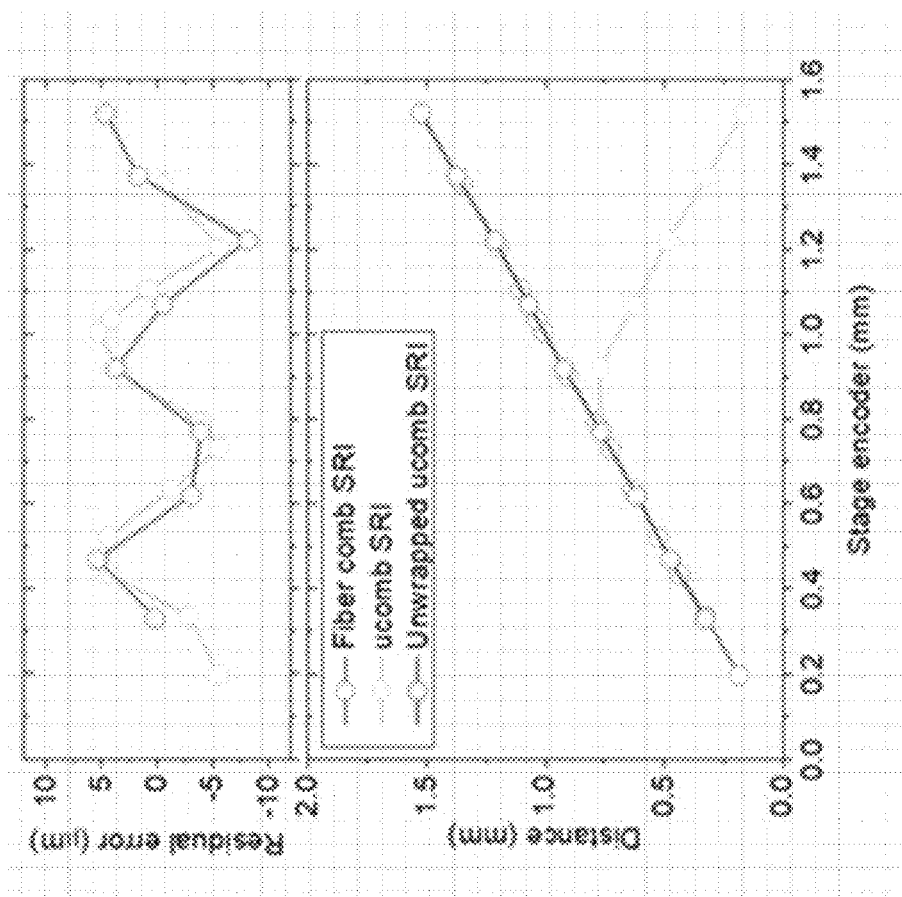
FIG. 10 illustrates evaluating the accuracy of a motorized stage by fiber comb and soliton microcomb in accordance with an embodiment of the invention.

Section S3. Reference Against a Stabilized Mode-Locked Fiber Laser Frequency Comb In many embodiments, a 250 MHz fiber comb (e.g., Menlo Systems) stabilized to 1 Hz laser with $10^{-15}$ fractional frequency stability (e.g., Stable Laser Systems) may be used to verify a spectrally-resolved interferometry for laser ranging metrology. The fiber comb can have optical power of 10 mW and 1560 nm central wavelength. In many embodiments, since the spectrometer cannot resolve the interference pattern when its period is smaller than the resolution of the spectrometer, the measurement range of the fiber comb-based SRI can be limited by the resolution of the spectrometer. For this reason, the target distance may be fixed near 6 mm. The same interferometer and data processing can be used for fiber comb-based SRI. FIG. 10 illustrates the measurement results of fiber comb-based spectral resolved interferometer in accordance with an embodiment of the invention. In particular, FIG. 10 illustrates evaluating the accuracy of motorized stage by fiber comb and soliton microcomb based spectral resolved interferometry in accordance with an embodiment of the invention. As illustrated, the lower panel shows distance measurement results from fiber comb and microcomb based spectral resolved interferometry versus the motorized stage encoder. Both independent measurements of fiber comb and microcomb based spectral resolved interferometry show positioning error of the motorized stage encoder about ±6 µm with cycle of 500 µm.

During the measurement of 100 seconds, the measured distance was nearly constant without any notable drift. The measurement repeatability is found to be 85.5 nm (24.5 nm) at averaging time of 1 second (10 seconds). The measurement repeatability of fiber comb-based SRI and soliton microcomb based SRI may be almost identical. It means that the noise of soliton microcomb in accordance with many embodiments does not significantly contribute to the measurement repeatability.

Section S4. Bounds on the Measurement Precision of Homodyne Interferometry.

Figure 8:
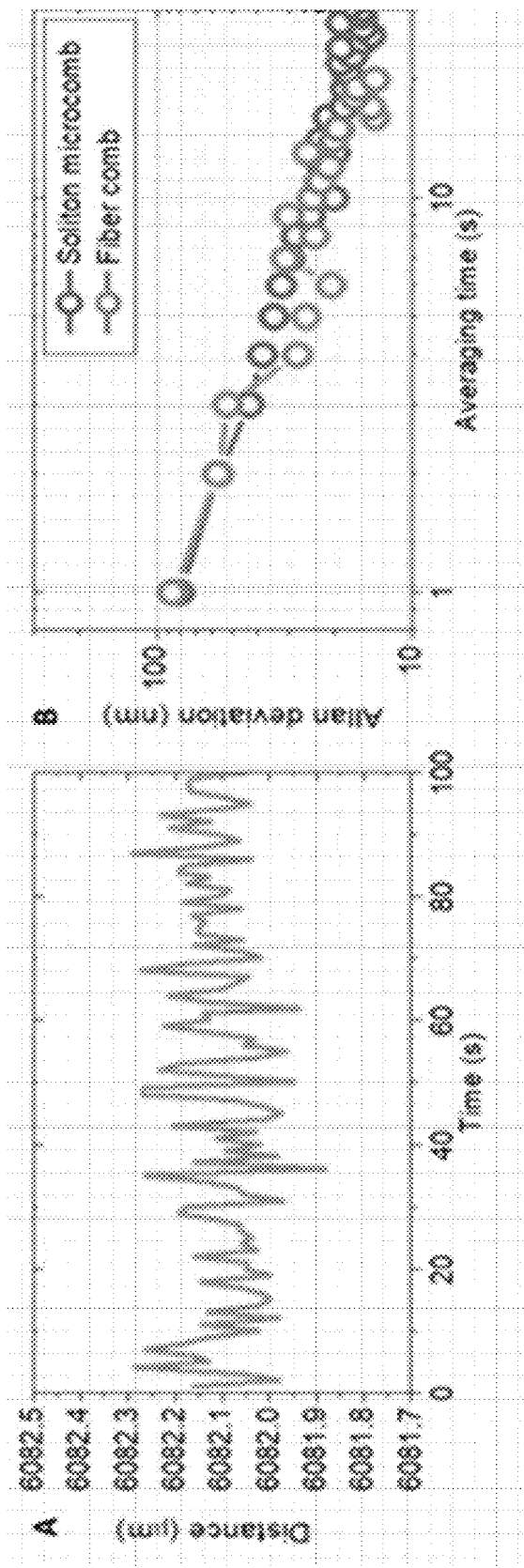
FIG. 8 illustrates measurement result of fiber comb-based SRI in accordance with an embodiment of the invention.

FIG. 8 illustrates measurement of fiber comb-based SRI in accordance with an embodiment of the invention. In particular, FIG. 8 item A illustrates a time trace of fiber comb-based SRI during 100 seconds in accordance with an embodiment of the invention. FIG. 8 item B illustrates measurement precision in terms of Allan deviation in accordance with an embodiment of the invention.

In many embodiments, the measurement repeatability of the homodyne interferometry may be limited by environmental long-term drift including drift of refractive index of air and thermal expansion of the target distance.

To evaluate ultimate measurement precision regardless of the long-term drift, many embodiments use 0.1 Hz high pass filter to minimize long-term drift effects on the precision. FIG. 9 illustrates a comparison between raw data and high pass filtered data. In particular, FIG. 9 item A illustrates time trace of homodyne interferometry during 1,000 seconds with raw data marked in yellow color in accordance with an embodiment of the invention. Its 0.1 Hz high pass filtered data is also plotted with gray color. The right inset illustrated in FIG. 9 item A illustrates those as a histogram. FIG. 9 item B illustrates measurement precision in terms of Allan deviation, with 0.1 Hz high-pass filtering to remove the long-term drift in accordance with an embodiment of the invention. Sub-nm measurement stability at 100 seconds averaging can be observed.

For the high pass filtered case, a standard deviation (1σ) is improved to 3.2 nm and slowly-varying fluctuation disappears. Assuming that a target is ideally fixed without long-term drift, measurement stability can be improved to be 0.1 nm at 100 seconds averaging time. Such measurement stability is close to a commercial HeNe laser interferometry.

Section S5. Position Calibration of Motorized Stage by Soliton Microcomb-Based Spectrally-Resolved Interferometry In many embodiments, to verify the linearity of soliton microcomb based SRI, a motorized stage (e.g., New Focus MFN25) may be used for comparison measurement. In several embodiments, however, its low accuracy for long-stroke translation makes measurement range for the linearity test to be limited less than 150 µm. In certain embodiments, on axis accuracy of the motorized stage is 10 µm. To calibrate position error of motorized stage, many embodiments compare the stage encoder value and measured distance by fiber comb-based SRI and soliton microcomb based SRI. Measurements found that on-axis accuracy of the motorized stage is about ±6 µm with cycle of 500 µm. In certain embodiments, this sinusoidal shaped cyclic error may be caused by mechanical structure of the motorized stage. Furthermore, in several embodiments, the linearity of the motorized stage is well maintained within 1 µm level at short range of 150 µm. Hence certain embodiments may choose this part for linearity evaluation of soliton microcomb based distance measurement.

Section S6. Position Calibration of Motorized Stage by Soliton Microcomb-Based Spectrally-Resolved Interferometry In many embodiments, to validate the microcomb SRI for potential 3D surface measurement, a cross-section may be measured of a standardized gauge block, used for practical length metrology in 3D surface measurements and industry standards. In certain embodiments, the reference mirror in the interferometer part may be replaced with the gauge block to measure the cross-section of the 3 mm height gauge block (e.g., Starrett RCM, 3.0 Al) that has a 300 nm uncertainty. The reference beam may be made with a 4% Fresnel reflection from the end of FC/PC fiber ferrule. The transmitted beam may be reflected from the target surface and sent to the optical spectrum analyzer along with the reference beam. The gauge block may be mounted on a flat mirror and the stage made an on-axis translation with 1.27 mm (0.05 inch) steps as shown in FIG. 11A in accordance with an embodiment of the invention.

Figure 11:
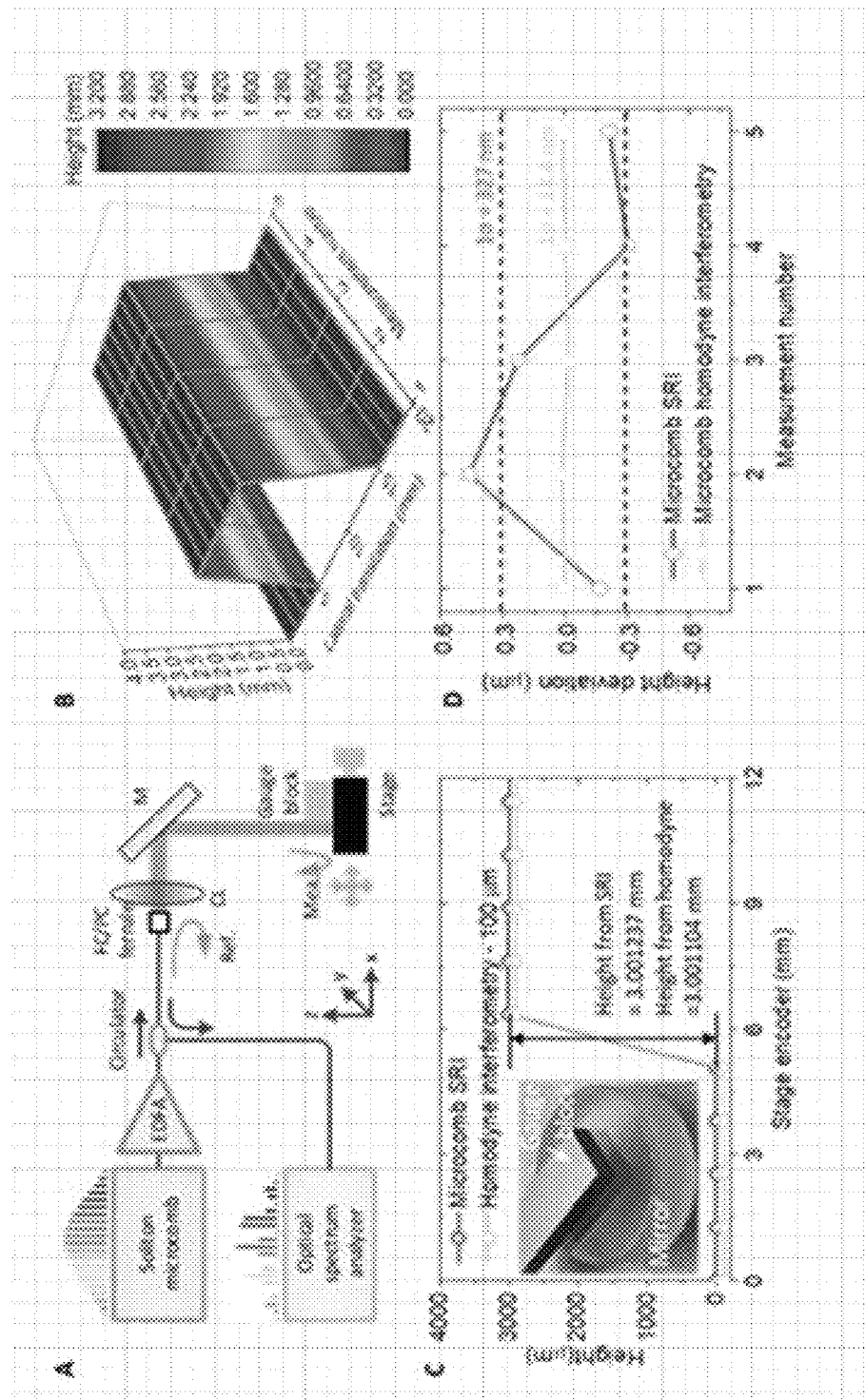
FIG. 11 illustrates measurement of a reference gauge block cross-section via x-axis scanning in accordance with an embodiment of the invention.

In particular, FIG. 11 illustrates measurement of a reference gauge block cross-section via x-axis scanning in accordance with an embodiment of the invention. FIG. 11 item A illustrates a measurement scheme for cross-section of gauge block with x-axis scanning stage. FIG. 11 item B illustrate a reconstructed cross-section of a gauge block. FIG. 11 item C illustrates the gauge block height is found to be 3.001237 mm and 3.001104 mm from soliton microcomb spectral interferometry and homodyne interferometry, matching well with reference specified height in accordance with an embodiment of the invention. FIG. 11 item D illustrates measurement repeatability of the gauge block height in accordance with an embodiment of the invention.

In certain embodiments, the distance at each step was recorded with 5 data points. The gauge block height may be determined by the difference of the absolute distances between mirror and gauge block surface, with the same empirical air refractive index of 1.000247 as noted above. The measured cross-section of the gauge block is shown in FIGS. 11B and 11C. The height of gauge block was found to be 3.001237 mm and 3.001104 mm from the microcomb SRI and homodyne interferometry respectively. In certain embodiments, there may be a different slope height between the mirror (1.413 μm/mm) and gauge block surface (−1.817 μm/mm). A tilting (cosine) error from imperfect plane-to-plane alignment may introduce the measurement error of 1.237 μm. As shown in FIG. 11D, the measurement repeatability taken over 5 consecutive measurements is determined to be 327 nm and 11.4 nm from microcomb spectral resolved interferometer and homodyne interferometry, respectively as the 1σ standard deviation.

Although specific methods and systems for soliton microcomb-based precision dimensional metrology via spectrally-resolved interferometry are discussed above, many different systems can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for soliton microcomb-based precision dimensional metrology via spectrally-resolved interferometry, comprising:
   a dual-pumped soliton microcomb generator comprising a pump, a microresonator, and
   an auxiliary pump and that generates a single-soliton microcomb;
   an erbium-doped fiber amplifier (EDFA) that amplifies a C-band section of the soliton microcomb;
   a non-polarizing beam splitter (BS) that divides the soliton microcomb pulses into a reference arm pulse and a measurement arm pulse for an interferometer and recombines the reference arm pulse and the measurement arm pulse into a recombined beam upon their return;
   a free-space collimator lens (CL);
   a reference mirror ($M_{REF}$); and
   a measurement mirror ($M_{MEA}$).

2. The system of claim 1, wherein the microresonator is a planar waveguide $Si_3N_4$ microresonator, wherein a width of the microresonator is adiabatically varied to tune dispersion and improve single-mode mode locking.

3. The system of claim 1, wherein the measurement mirror ($M_{MEA}$) is mounted on a motorized stage for translation motion on a measurement path.

4. The system of claim 1, wherein the pump laser is set to generate the single-soliton state with counter-clockwise propagation in the microresonator and the auxiliary pump laser wavelength is set for blue-detuning to thermally stabilize the microresonator with clockwise propagation.

5. The system of claim 1, wherein the recombined beam is collimated into a single-mode fiber and sent to an optical spectrum analyzer.

6. The system of claim 4, wherein the optical spectrum analyzer reads out a tooth-resolved and high-visibility interferogram.

7. The system of claim 1, wherein the C-band section ranges from 1530 nm to 1565 nm.

8. The system of claim 1, wherein the non-polarizing beam splitter is a non-polarizing beam splitter with 50:50 dividing ratio that divides an 88.5 GHz soliton microcomb.

9. The system of claim 1, wherein the soliton microcomb has a large free-spectral range of 88.5 GHz.

10. The system of claim 1, further comprising using homodyne interferometry to improve the distance metrology precision.

11. A method for soliton microcomb-based precision dimensional metrology via spectrally-resolved interferometry, comprising:
   generating a single-soliton microcomb using a dual-pumped soliton microcomb generator comprising a TE pump, a microresonator, and an TM auxiliary pump;
   amplifying a C-band section of the soliton microcomb using an erbium-doped fiber amplifier (EDFA);
   dividing, using a non-polarizing beam splitter (BS), the soliton microcomb pulses into a reference arm pulse and a measurement arm pulse for an interferometer and recombining the reference arm pulse and the measurement arm pulse into a recombined beam upon their return.

12. The method of claim 10, wherein the microresonator is a planar waveguide $Si_3N_4$ microresonator, wherein a width of the microresonator is adiabatically varied to tune dispersion and improve single-mode mode locking.

13. The method of claim 10, wherein the measurement mirror ($M_{MEA}$) is mounted on a motorized stage for translation motion on a measurement path.

14. The method of claim 10, wherein the TE pump laser is set to generate the single-soliton state with counter-clockwise propagation in the microresonator and the TM auxiliary laser wavelength is set for blue-detuning to thermally stabilize the microresonator with clockwise propagation.

15. The method of claim 10, wherein the recombined beam is collimated into a single-mode fiber and sent to an optical spectrum analyzer.

* * * * *